(12) United States Patent
Wittek et al.

(10) Patent No.: US 7,595,101 B2
(45) Date of Patent: Sep. 29, 2009

(54) LIQUID-CRYSTALLINE MEDIUM

(75) Inventors: Michael Wittek, Darmstadt (DE);
Elvira Montenegro, Weinheim (DE);
Konstantin Schneider, Bad Camberg
(DE); Brigitte Schuler, Grossostheim
(DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 11/866,710

(22) Filed: Oct. 3, 2007

(65) Prior Publication Data
US 2008/0083904 A1 Apr. 10, 2008

(30) Foreign Application Priority Data
Oct. 4, 2006 (DE) .................. 10 2006 046 907
Feb. 9, 2007 (DE) .................. 10 2007 007 143

(51) Int. Cl.
C09K 19/12 (2006.01)
C09K 19/30 (2006.01)
C09K 19/34 (2006.01)
C09K 19/20 (2006.01)

(52) U.S. Cl. .................. 428/1.1; 428/1.3; 252/299.61; 252/299.63; 252/299.66; 252/299.67

(58) Field of Classification Search .................. 428/1.1, 428/1.3; 252/299.01, 299.61, 299.63, 299.66, 252/299.67
See application file for complete search history.

(56) References Cited

U.S. PATENT DOCUMENTS

| | | | | |
|---|---|---|---|---|
| 6,315,922 B1 * | 11/2001 | Takeshita et al. | ....... | 252/299.61 |
| 6,325,949 B1 * | 12/2001 | Takeshita et al. | ....... | 252/299.63 |
| 6,497,929 B1 * | 12/2002 | Miyairi et al. | ............... | 428/1.1 |
| 7,470,456 B2 * | 12/2008 | Yanai et al. | .................. | 428/1.1 |

* cited by examiner

*Primary Examiner*—Shean C Wu
(74) *Attorney, Agent, or Firm*—Millen, White, Zelano, Branigan, P.C.

(57) ABSTRACT

Disclosed are a liquid-crystalline medium, which contains a compound of formula I

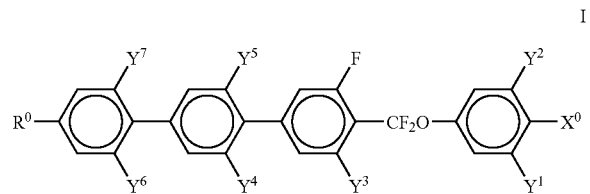

and the use thereof for electro-optical purposes, in particular for TN, TFT, IPS or OCB displays.

52 Claims, No Drawings

LIQUID-CRYSTALLINE MEDIUM

The present invention relates to a liquid-crystalline medium (LC medium), to the use thereof for electro-optical purposes, and to LC displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Examples of non-linear elements which can be used to individually switch the individual pixels are active elements (i.e. transistors). The term "active matrix" is then used, where a distinction can be made between two types:
1. MOS (metal oxide semiconductor) or other diodes on silicon wafers as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal-insulator-metal).

MLC displays of this type are particularly suitable for TV applications (for example pocket televisions) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable lifetimes. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not satisfy today's requirements.

Besides liquid-crystal displays which use backlighting, i.e. are operated transmissively and if desired transflectively, reflective liquid-crystal displays are also particularly interesting. These reflective liquid-crystal displays use the ambient light for information display. They thus consume significantly less energy than backlit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the trans-missive TFT-TN displays which are generally conventional, the use of liquid crystals of low birefringence ($\Delta n$) is necessary in order to achieve low optical retardation ($d \cdot \Delta n$). This low optical retardation results in usually acceptably low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

Thus, there continues to be a great demand for MLC displays having very high specific resistance at the same time as a large working-temperature range, short response times, even at low temperatures, and a low threshold voltage which do not exhibit these disadvantages or only do so to a lesser extent.

In the case of TN (Schadt-Helfrich) cells, media are desired which facilitate the following advantages in the cells:

extended nematic phase range (in particular down to low temperatures)

switchability at extremely low temperatures (outdoor use, automobiles, avionics)

increased resistance to UV radiation (longer life)

low threshold voltage.

The media available from the prior art do not enable these advantages to be achieved while simultaneously retaining the other parameters.

In the case of supertwisted (STN) cells, media are desired which facilitate greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

In particular in the case of LC displays for TV and video applications (for example LCD-TVs, monitors, PDAs, notebooks, games consoles), a significant reduction in the response times is desired. This requires LC mixtures having low rotational viscosities. At the same time, the LC media should have high clearing points.

The invention has the object of providing media, in particular for MLC, IPS, TN or STN displays of this type, which do not exhibit the disadvantages mentioned above or only do so to a lesser extent, and preferably have fast response times and low rotational viscosities at the same time as a high clearing point, as well as high dielectric anisotropy and a low threshold voltage.

It has now been found that this object can be achieved if LC media comprising one or more compounds of the formula I are used. The compounds of the formula I result in mixtures having the desired properties indicated above.

The invention relates to a liquid-crystalline medium, characterised in that it comprises one or more compounds of the formula I

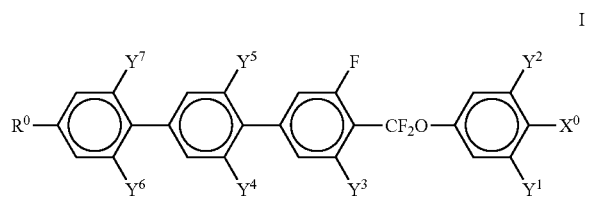

in which $R^0$ denotes a halogenated or unsubstituted alkyl or alkoxy radical having 1 to 15 C atoms, where, in addition, one or more $CH_2$ groups in these radicals may each, independently of one another, be replaced by —C≡C—, —$CF_2O$—, —CH=CH—,

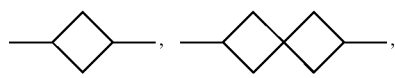

—O—, —CO—O— or —O—CO— in such a way that O atoms are not linked directly to one another, $X^0$ denotes F, Cl, CN, $SF_5$, SCN, NCS, a halogenated alkyl radical, a halogenated alkenyl radical, a halogenated alkoxy radical or a halogenated alkenyloxy radical having up to 6 C atoms, and $Y^{1-7}$ each, independently of one another, denote H or F.

The invention furthermore relates to the use of LC media as described above and below for electro-optical purposes, in particular in LC displays, in particular in TN, TFT, IPS or OCB displays.

The invention furthermore relates to an electro-optical LC display, in particular a TN, TFT, IPS or OCB display, containing an LC medium as described above and below.

Surprisingly, it has been found that the compounds of the formula I have an advantageous rotational viscosity (γ)/clearing point ratio. They are therefore particularly suitable for achieving liquid-crystal mixtures of low γ and high clearing point. In addition, the compounds of the formula I exhibit good solubility in LC media. LC media according to the invention comprising compounds of the formula I have a low rotational viscosity, fast response times, a relatively high clearing point, high positive dielectric anisotropy, high birefringence and a broad nematic phase range. They are therefore particularly suitable for TV and video applications.

The compounds of the formula I have a broad range of applications. Depending on the choice of substituents, they can serve as base materials of which liquid-crystalline media are predominantly composed; however, liquid-crystalline base materials from other classes of compound can also be added to the compounds of the formula I in order, for example, to modify the dielectric and/or optical anisotropy of a dielectric of this type and/or to optimise its threshold voltage and/or its viscosity.

In the pure state, the compounds of the formula I are colourless and form liquid-crystalline mesophases in a temperature range which is favourably located for electro-optical use. They are stable chemically, thermally and to light.

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

If $R^0$ in the formulae above and below denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If $R^0$ denotes an alkyl radical in which one $CH_2$ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If $R^0$ denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

In the formulae above and below, $X^0$ is preferably F, Cl or mono- or polyfluorinated alkyl or alkoxy having 1, 2 or 3 C atoms or mono- or polyfluorinated alkenyl having 2 or 3 C atoms. $X^0$ is particularly preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$, $OCH=CF_2$ or $CH=CF_2$, very particularly preferably F or $OCF_3$, furthermore $OCHF_2$ and $OCH=CF_2$.

Particular preferences given to compounds of the formula I in which $X^0$ denotes F or $OCF_3$, preferably F. further preferred compounds of the formula I of those in which $Y^1$ denotes F, those in which $Y^2$ denotes F, those in which $Y^3$ denotes H, those in which $Y^4$ denotes H and $Y^5$ denotes F, and those in which denotes $Y^6$ and $Y^7$ H.

Particularly preferred compounds of the formula I are selected from the following sub-formulae:

Ia

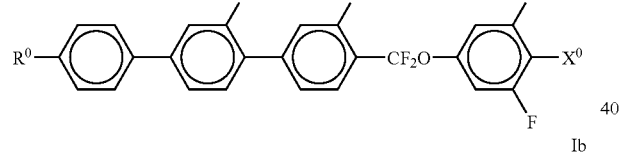

Ib

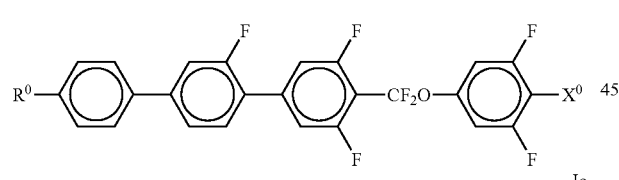

Ic

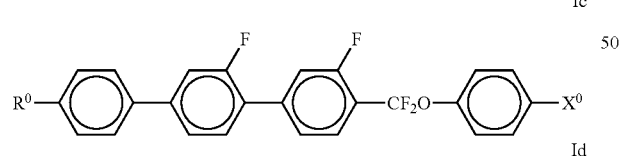

Id

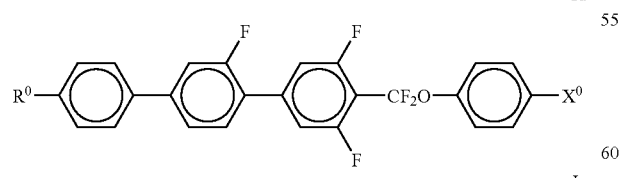

Ie

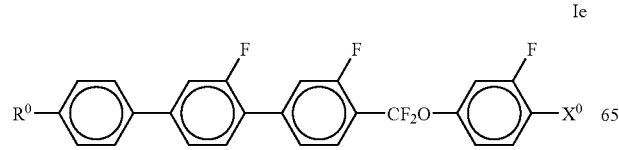

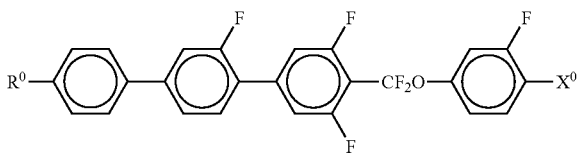

If

In which $R^0$ and $X^0$ have the meaning indicated in formula I. $R^0$ preferably denotes straight-chain alkyl having 1 to 8 C atoms, furthermore alkenyl having 2 to 7 C atoms.

Further preferred embodiments are indicated below:
The medium additionally comprises one or more compounds of the formulae II and/or III:

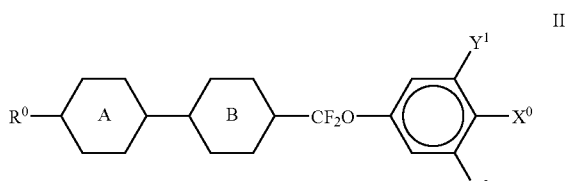

II

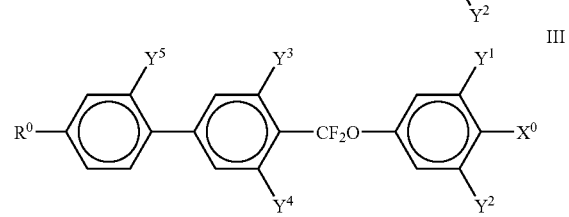

III in which $R^0$, $X^0$ and $Y^{1-5}$ have the meaning indicated in formula I, and

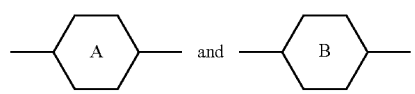

each, independently of one another, denote

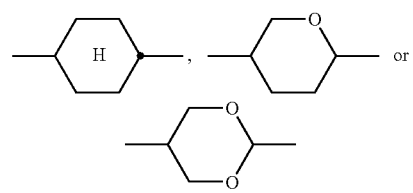

The compounds of the formula II are preferably selected from the following formulae:

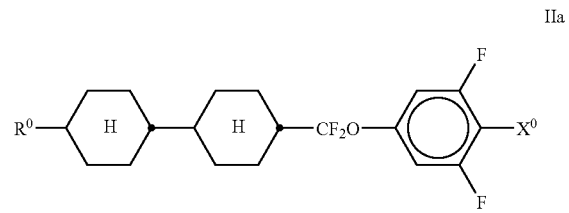

IIa

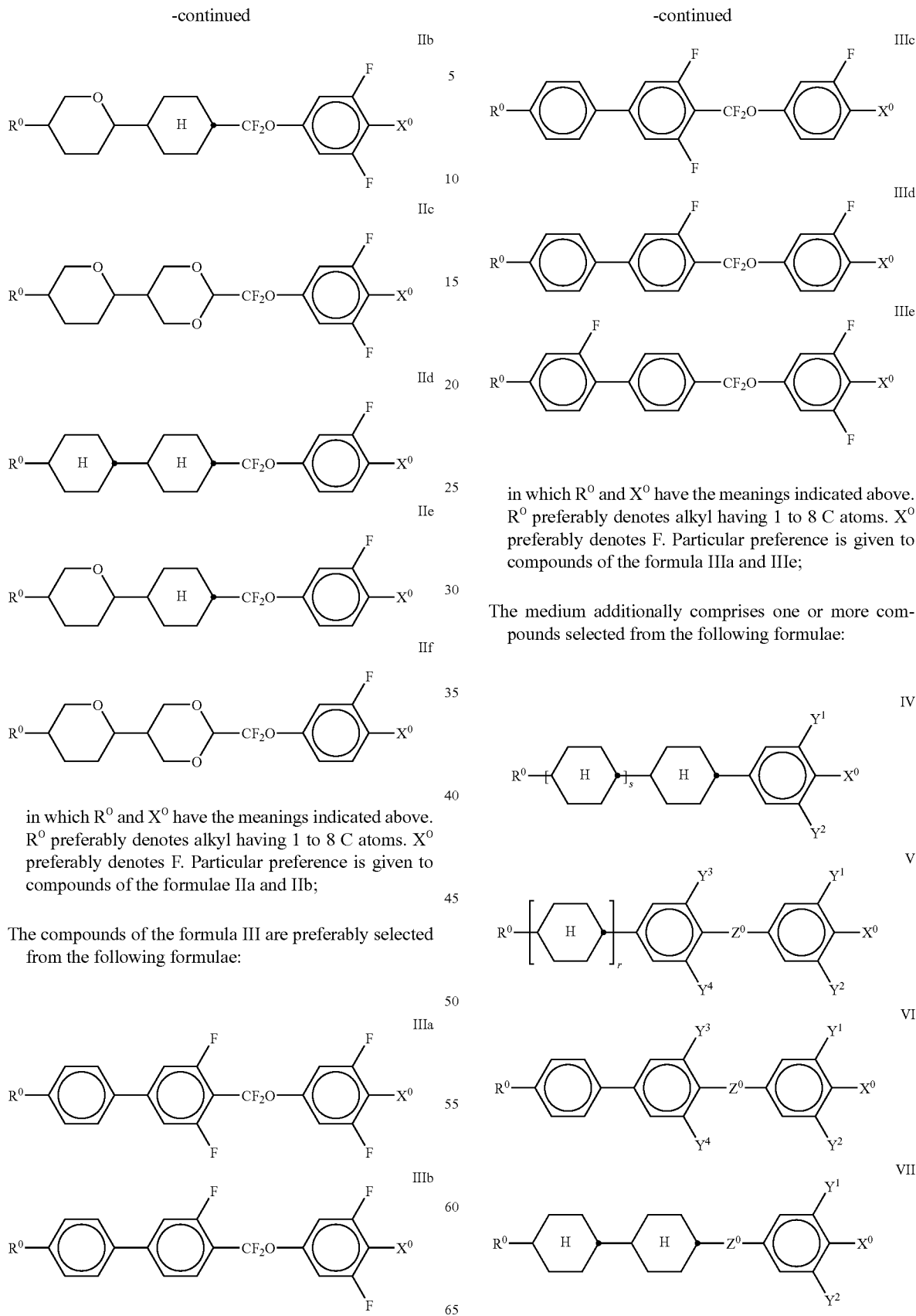

in which $R^0$ and $X^0$ have the meanings indicated above. $R^0$ preferably denotes alkyl having 1 to 8 C atoms. $X^0$ preferably denotes F. Particular preference is given to compounds of the formulae IIa and IIb;

The compounds of the formula III are preferably selected from the following formulae:

in which $R^0$ and $X^0$ have the meanings indicated above. $R^0$ preferably denotes alkyl having 1 to 8 C atoms. $X^0$ preferably denotes F. Particular preference is given to compounds of the formula IIIa and IIIe;

The medium additionally comprises one or more compounds selected from the following formulae:

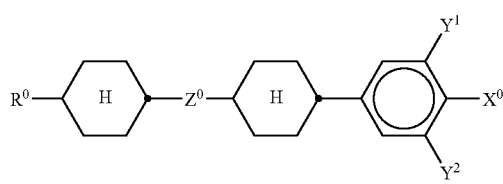
VIII in which R⁰, X⁰ and Y¹⁻⁴ have the meanings indicated in formula I, Z⁰ denotes —C₂H₄—, —(CH₂)₄—, —CH=CH—, —CF=CF—, —C₂F₄—, —CH₂CF₂—, —CF₂CH₂—, —CH₂O—, —OCH₂—, —COO— or —OCF₂—, in formulae V and VI also a single bond, in formulae V and VII also —CF₂O—, and r denotes 0 or 1, and s denotes 0 or 1;

The compounds of the formula IV are preferably selected from the following formulae:

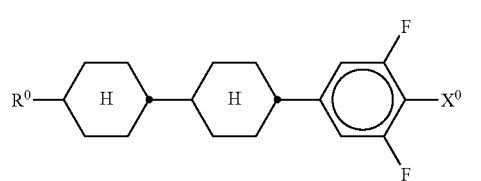
IVa

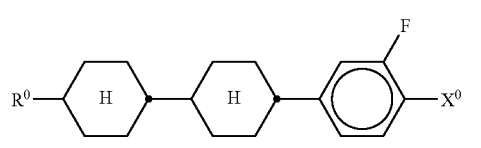
IVb

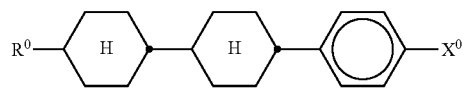
IVc

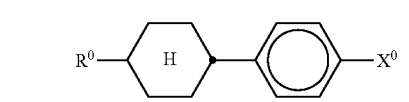
IVd in which R⁰ and X⁰ have the meanings indicated above. R⁰ preferably denotes alkyl having 1 to 8 C atoms. X⁰ preferably denotes F or OCF₃, furthermore Cl;

The compounds of the formula V are preferably selected from the following formulae:

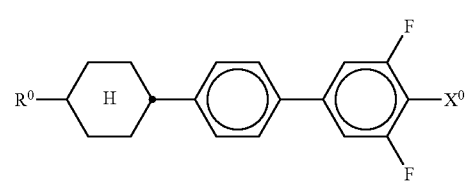
Va

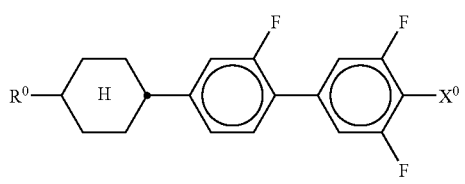
Vb

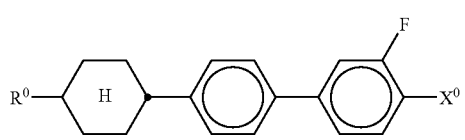
Vc

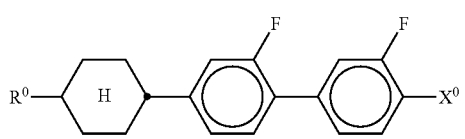
Vd

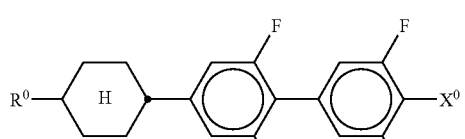
Ve

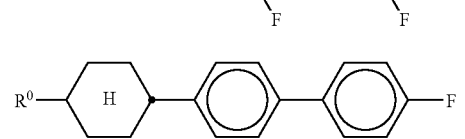
Vf

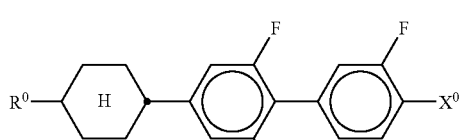
Vg

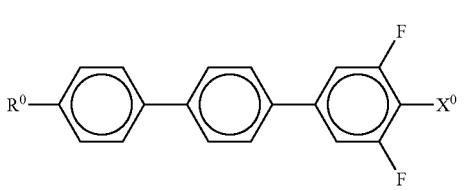
Vh in which R⁰ and X⁰ have the meanings indicated above. R⁰ preferably denotes alkyl having 1 to 8 C atoms. X⁰ preferably denotes F and OCF₃, furthermore OCHF₂ and OCH=CF₂;

The compounds of the formula VI are preferably selected from the following formulae:

VIa

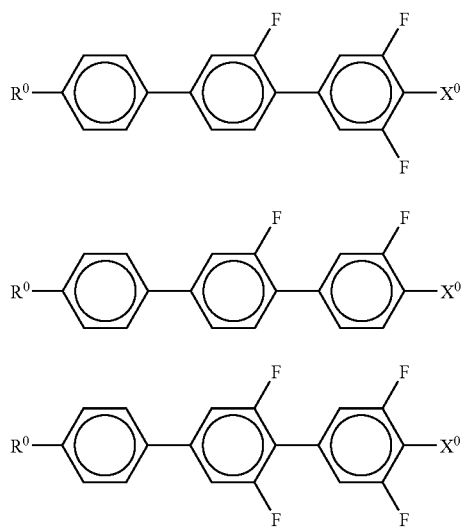

VIb

VIc

VId in which R⁰ and X⁰ have the meanings indicated above. R⁰ preferably denotes alkyl having 1 to 8 C atoms. X⁰ denotes F, furthermore OCF₃, OCHF₂ and OCH=CF₂;

The compounds of the formula VII are preferably selected from the following formulae:

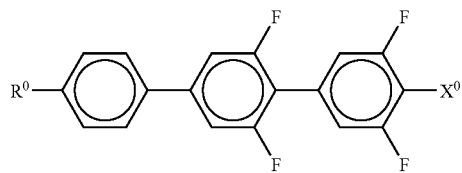

VIIa

VIIb in which R⁰ and X⁰ have the meanings indicated above. R⁰ preferably denotes alkyl having 1 to 8 C atoms. X⁰ denotes F, furthermore OCF₃, OCHF₂ and OCH=CF₂;

The medium comprises one or more compounds selected from the following formulae:

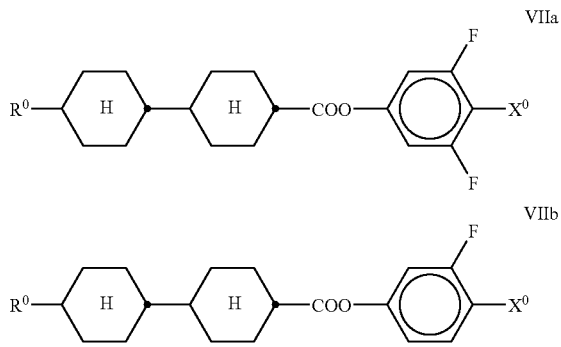

IX

X

XI

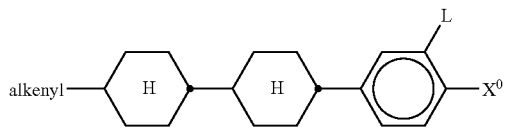

XII in which X⁰ has the meaning indicated above, and

L denotes H or F,

"alkyl" denotes C₁₋₇-alkyl,

R' denotes C₁₋₇-alkyl, C₁₋₆-alkoxy or C₂₋₇-alkenyl, and

"alkenyl" and "alkenyl*" each, independently of one another, denote C₂₋₇-alkenyl.

The compounds of the formulae IX-XII are preferably selected from the following formulae:

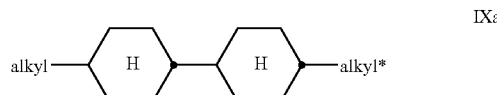

IXa

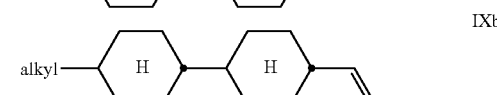

IXb

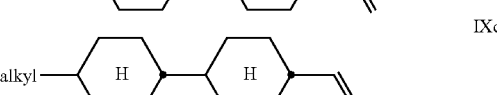

IXc

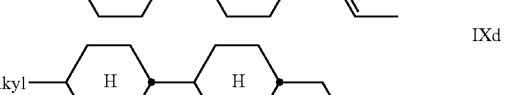

IXd

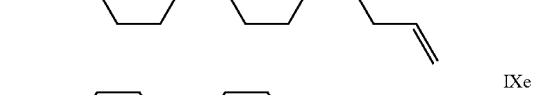

IXe

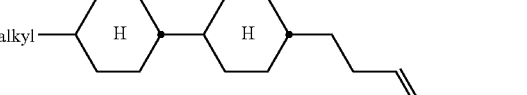

Xa

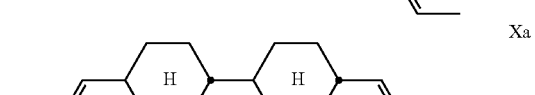

Xb

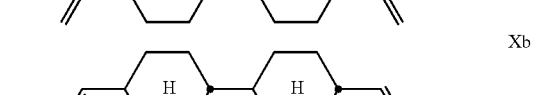

XIa

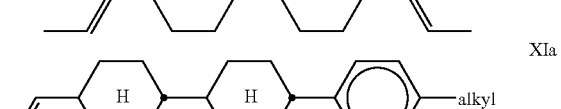

XIIa in which "alkyl" and "alkyl*" each, independently of one another, denote C₁₋₇-alkyl;

The medium additionally comprises one or more compounds selected from the following formulae:

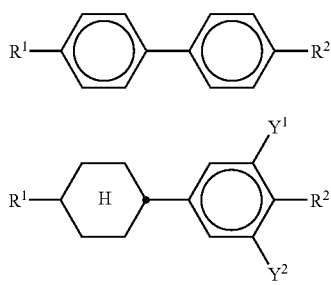   XIII

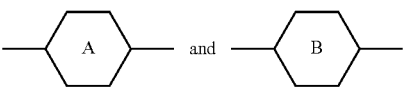   XIV in which $Y^{1,2}$ have the meanings indicated above, and $R^1$ and $R^2$ each, independently of one another, denote n-alkyl, alkoxy, oxaalkyl, fluoroalkyl or alkenyl, each having up to 9 C atoms, and preferably each, independently of one another, denote alkyl having 1 to 8 C atoms;

the medium comprises one or more compounds of the formula XIII in which at least one of the radicals $R^1$ and $R^2$ denotes alkenyl having 2 to 7 C atoms, preferably those selected from the following formulae:

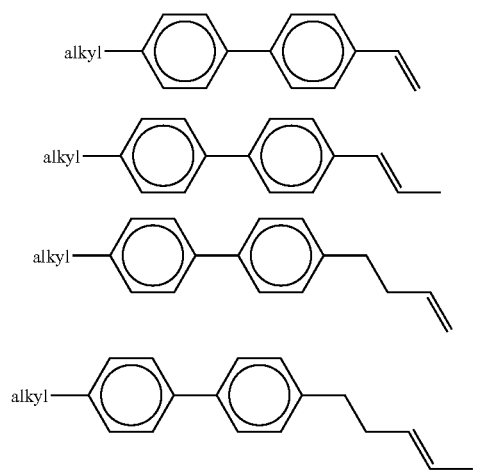

XIIIa

XIIIb

XIIIc

XIIId in which "alkyl" has the meaning indicated above;

The medium comprises one or more compounds of the following formulae:

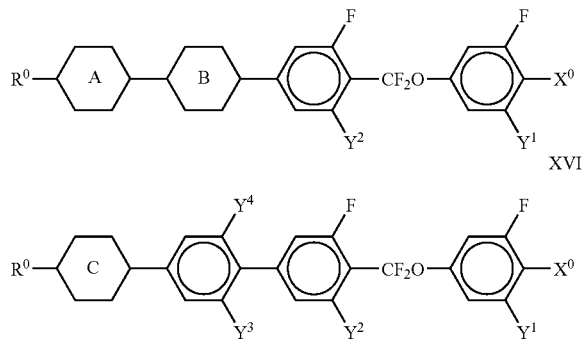

XV

XVI in which $R^0$, $X^0$ and $Y^{1-4}$ have the meanings indicated in formula I, and

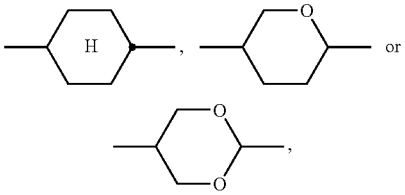

each, independently of one another, denote

and

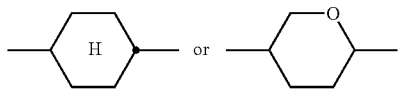

denotes

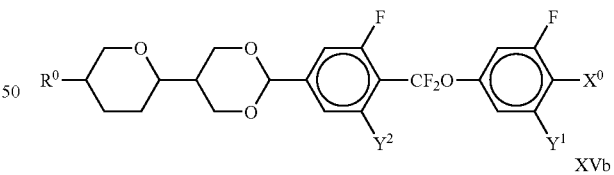

and $L^1$ and $L^2$ each, independently of one another, denote H or F;

The compounds of the formulae XV and XVI are preferably selected from the following formulae:

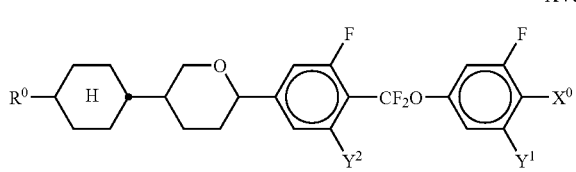

XVa

XVb

XVc

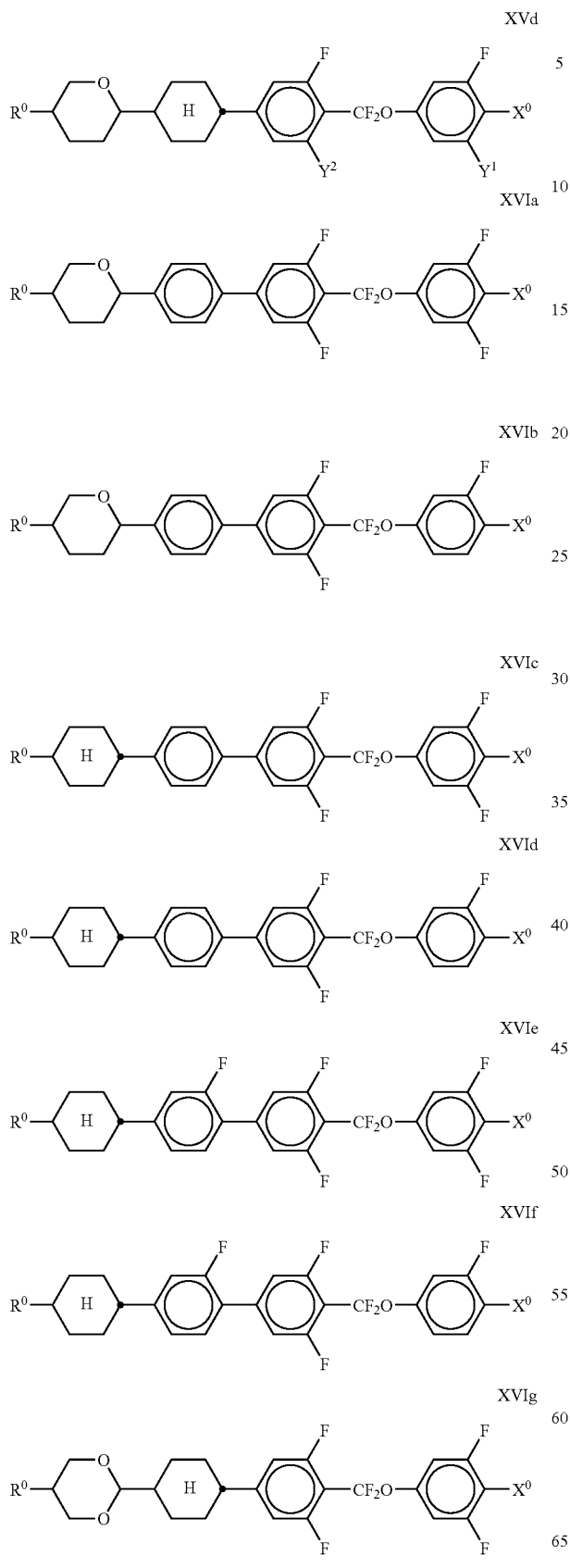

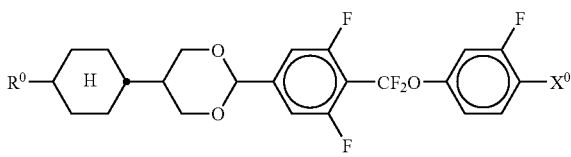

in which $R^0$ and $X^0$ have the meanings indicated above. $R^0$ preferably denotes alkyl having 1 to 8 C atoms. $X^0$ preferably denotes F, furthermore $OCF_3$. Particularly preferred compounds of the formulae XV and XVa-XVd are those in which $Y^1$ denotes F and $Y^2$ denotes H or F, preferably F;

The medium comprises one or more compounds of the following formula:

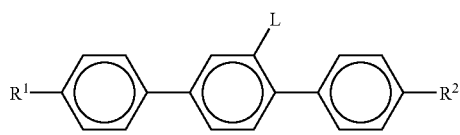

in which $R^1$ and $R^2$ have the meaning indicated above and preferably each, independently of one another, denote alkyl having 1 to 8 C atoms. L denotes H or F;

The medium comprises one or more compounds of the following formulae:

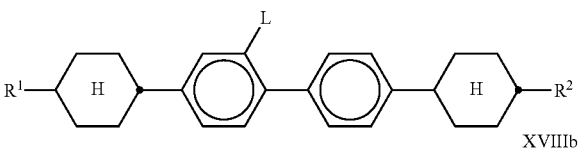

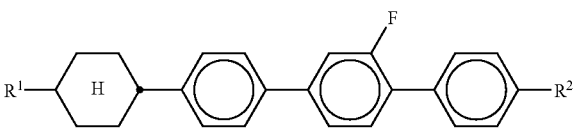

in which $R^1$ and $R^2$ have the meaning indicated above and preferably each, independently of one another, denote alkyl having 1 to 8 C atoms. L denotes H or F;

The medium additionally comprises one or more compounds selected from the following formulae:

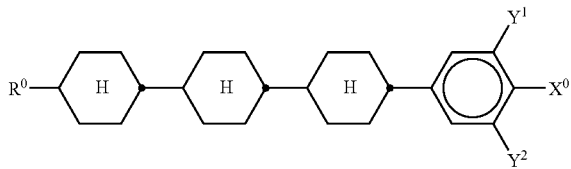

-continued

XX
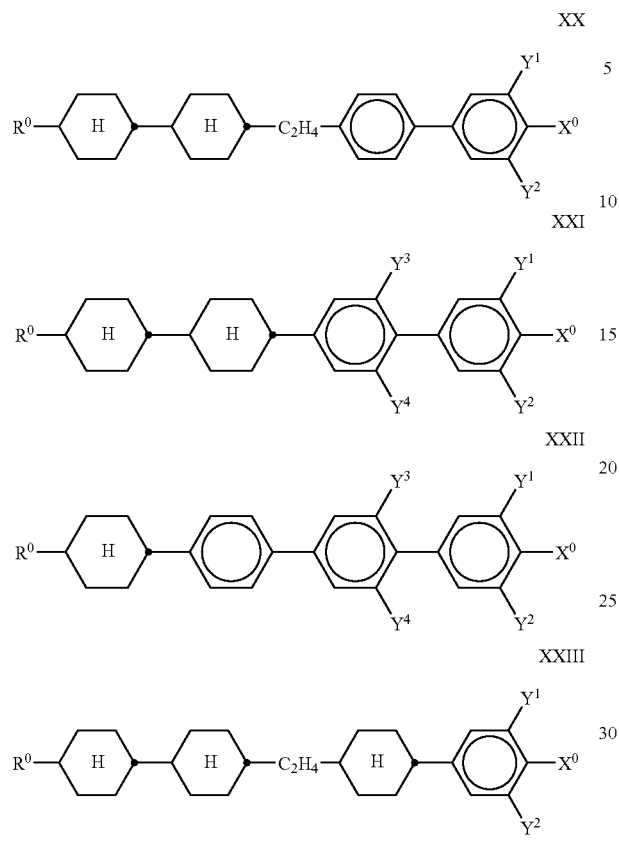

XXI

XXII

XXIII in which R⁰ and X⁰ each, independently of one another, have one of the meanings indicated above, and Y$^{1-4}$ each, independently of one another, denote H or F. X⁰ is preferably F, Cl, CF$_3$, OCF$_3$ or OCHF$_2$. R⁰ preferably denotes alkyl, alkoxy, oxaalkyl, fluoroalkyl or alkenyl, each having up to 8 C atoms.

The medium additionally comprises one or more compounds selected from the following formula:

XXIV
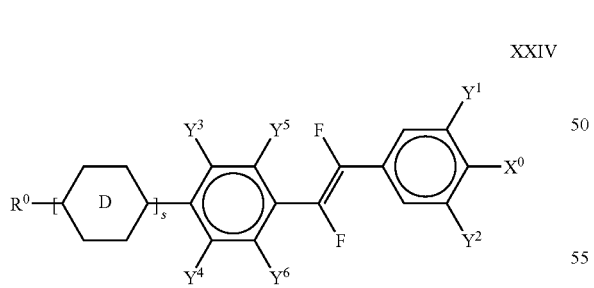

in which R⁰, X⁰ and Y$^{1-6}$ have the meaning indicated in formula I, s denotes 0 or 1, and

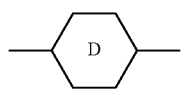

denotes

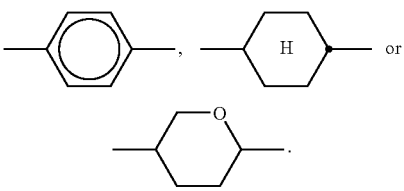

R⁰ preferably denotes alkyl having 1 to 8 C atoms. X⁰ preferably denotes F;

The compounds of the formula XXIV are preferably selected from the following formulae:

XXIVa
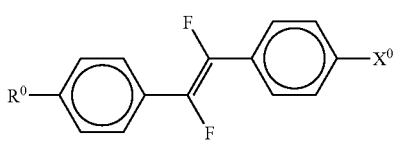

XXIVb
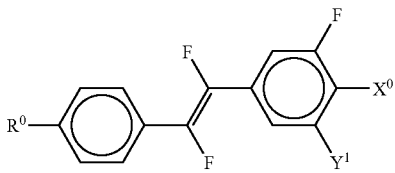

XXIVc
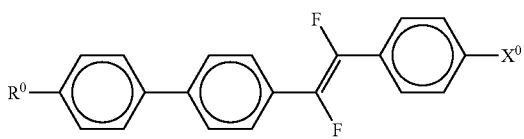

XXIVd
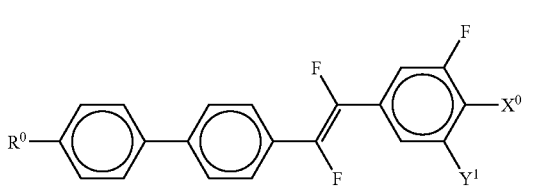

XXIVe
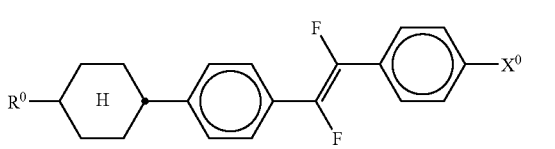

XXIVf
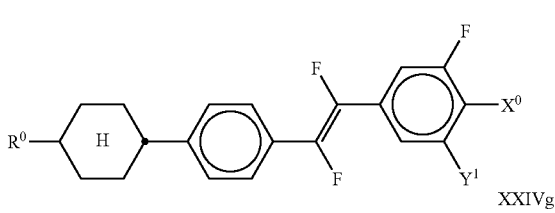

XXIVg
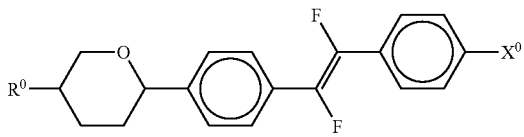

-continued

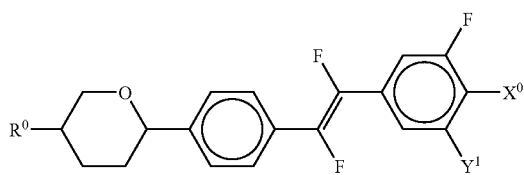
XXIVh in which R⁰, X⁰ and Y¹ have the meanings indicated above. R⁰ preferably denotes alkyl having 1 to 8 C atoms. X⁰ preferably denotes F. and Y¹ is preferably F;

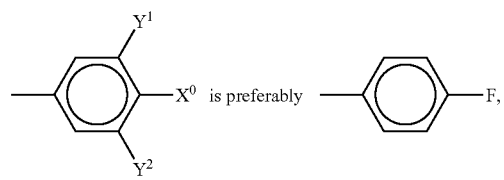 is preferably 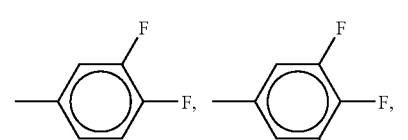,

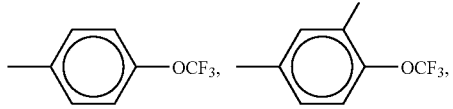

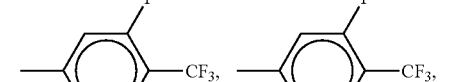

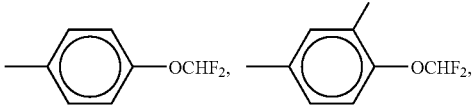

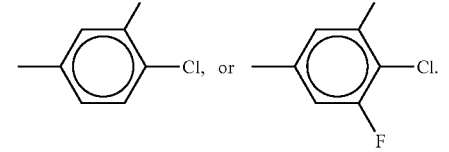

R⁰ is straight-chain alkyl or alkenyl having 2 to 7 C atoms;
The medium comprises one or more compounds of the following formulae:

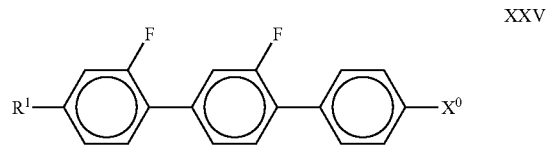
XXV

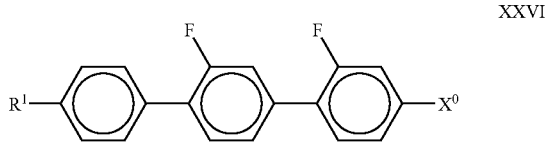
XXVI in which R¹ and X⁰ have the meaning indicated above. R¹ preferably denotes alkyl having 1 to 8 C atoms. X⁰ preferably denotes F or Cl. In the formula XXV, X⁰ very particularly preferably denotes Cl.

The medium comprises one or more compounds of the following formulae:

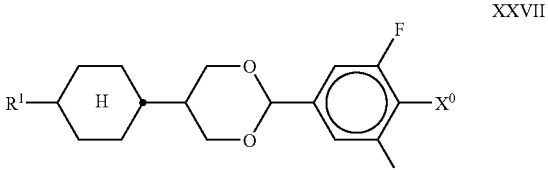
XXVII

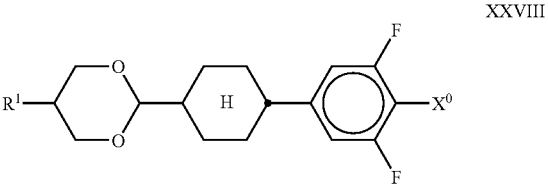
XXVIII in which R¹ and X⁰ have the meaning indicated above. R¹ preferably denotes alkyl having 1 to 8 C atoms. X⁰ preferably denotes F;

Further preferred embodiments are indicated below:

The medium comprises one, two or more compounds of the formula I, in particular of the formula Ia, Ib or Ic;

The medium comprises 2-30% by weight, preferably 3-20% by weight, particularly preferably 3-15% by weight, of compounds of the formula I;

The medium comprises compounds selected from the formulae I, II, III, IX-XIII, XVII and XVIII;

The proportion of compounds of the formulae II, III, IX-XIII, XVII and XVIII in the mixture as a whole is 40 to 95% by weight;

The medium comprises 10-50% by weight, particularly preferably 12-40% by weight, of compounds of the formulae II and/or III;

the medium comprises 20-70% by weight, particularly preferably 25-65% by weight, of compounds of the formulae IX-XIII;

The medium comprises 4-30% by weight, particularly preferably 5-20% by weight, of compounds of the formula XVIII;

The medium comprises 1-20% by weight, particularly preferably 2-15% by weight, of compounds of the formula XVIII.

It has been found that even a relatively small proportion of compounds of the formula I mixed with conventional liquid-crystal materials, but in particular with one or more compounds of the formulae II to XXVIII, results in a significant increase in the light stability and in low birefringence values, with broad nematic phases with low smectic-nematic transition temperatures being observed at the same time, improving the shelf life. At the same time, the mixtures exhibit very low threshold voltages and very good values for the VHR on exposure to UV.

The term "alkyl" or "alkyl*" encompasses straight-chain and branched alkyl groups having 1-7 carbon atoms, in particular the straight-chain groups methyl, ethyl, propyl, butyl, pentyl, hexyl and heptyl. Groups having 1-6 carbon atoms are generally preferred.

The term "alkenyl" or "alkenyl*" encompasses straight-chain and branched alkenyl groups having 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine or polyfluorinated alkyl chains are not excluded.

The term "oxaalkyl" or "alkoxy" preferably encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. The mixtures according to the invention are distinguished, in particular, by high $K_1$ values and thus have significantly faster response times than the mixtures from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the mixtures according to the invention is not crucial. The mixtures can therefore comprise one or more further components for the purposes of optimisation of various properties. However, the observed effect on the desired improvement in the properties of the mixture is generally greater, the higher the total concentration of compounds of the above-mentioned formulae.

In a particularly preferred embodiment, the media according to the invention comprise compounds of the formulae II to VIII (preferably II, III, IV and V, in particular IIa and IIIa), in which $X^0$ denotes F, $OCF_3$, $OCHF_2$, OCH=$CF_2$, OCF=$CF_2$ or $OCF_2$—$CF_2H$. A favourable synergistic action with the compounds of the formula I results in particularly advantageous properties. In particular, mixtures comprising compounds of the formulae I, IIa and IIIa are distinguished by their low threshold voltage.

The individual compounds of the above-mentioned formulae and the sub-formulae thereof which can be used in the media according to the invention are either known or can be prepared analogously to the known compounds.

The invention also relates to electro-optical displays, such as, for example, STN or MLC displays, having two plane-parallel outer plates, which, together with a frame, form a cell, integrated non-linear elements for switching individual pixels on the outer plates, and a nematic liquid-crystal mixture having positive dielectric anisotropy and high specific resistance located in the cell, which contain media of this type, and to the use of these media for electro-optical purposes.

The liquid-crystal mixtures according to the invention enable a significant broadening of the available parameter latitude. The achievable combinations of clearing point, viscosity at low temperature, thermal and UV stability and high optical anisotropy are far superior to previous materials from the prior art.

The mixtures according to the invention are particularly suitable for mobile applications and low-Δn TFT applications, such as, for example, mobile telephones and PDAs. Furthermore, the mixtures according to the invention can be used in OCB and IPS displays The liquid-crystal mixtures according to the invention, while retaining the nematic phase down to −20° C. and preferably down to −30° C., particularly preferably down to −40° C., and the clearing point≧70° C., preferably ≧75° C., at the same time allow rotational viscosities $\gamma_1$ of ≦90 mPa·s, particularly preferably ≦70 mPa·s, to be achieved, enabling excellent MLC displays having fast response times to be achieved.

The dielectric anisotropy Δ∈ of the liquid-crystal mixtures according to the invention is preferably ≧+3, particularly preferably ≧+4. In addition, the mixtures are characterised by low operating voltages. The threshold voltage of the liquid-crystal mixtures according to the invention is preferably ≦2.0 V. The birefringence Δn of the liquid-crystal mixtures according to the invention is preferably ≧0.10, particularly preferably ≧0.11.

The nematic phase range of the liquid-crystal mixtures according to the invention preferably has a width of at least 90°, in particular at least 100°. This range preferably extends at least from −25° to +70° C.

It goes without saying that, through a suitable choice of the components of the mixtures according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain mixtures having a higher Δ∈ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR on UV exposure than analogous mixtures comprising cyano-phenylcyclohexanes of the formula

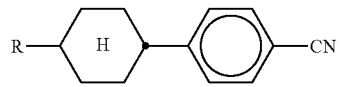

or esters of the formula

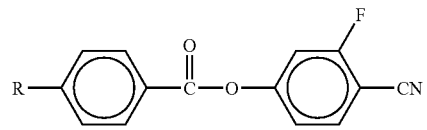

instead of the compounds of the formula I.

The light stability and UV stability of the mixtures according to the invention are considerably better, i.e. they exhibit a significantly smaller decrease in the HR on exposure to light or UV. Even low concentrations of the compounds (<10% by weight) of the formula I in the mixtures increase the HR by 6% or more compared with mixtures from the prior art.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se, for example by mixing one or more compounds of the formula I with one or more compounds of the formulae II-XXVIII or with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV stabilisers, such as Tinuvin® from Ciba, antioxidants, free-radical scavengers, nanoparticles, etc. For example, 0-15% of pleochroic dyes or chiral dopants can be added. Suitable stabilisers and dopants are mentioned below in Tables C and D.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m C atoms respectively; n and m are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1-}$, $R^{2-}$, $L^{1-}$ and $L^{2-}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |
| nN•F | $C_nH_{2n+1}$ | CN | F | H |
| nN•F•F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF•F | $C_nH_{2n+1}$ | F | F | H |
| nF•F•F | $C_nH_{2n+1}$ | F | F | F |
| nOCF$_3$ | $C_nH_{2n+1}$ | OCF$_3$ | H | H |
| nOCF$_3$•F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are shown in Tables A and B.
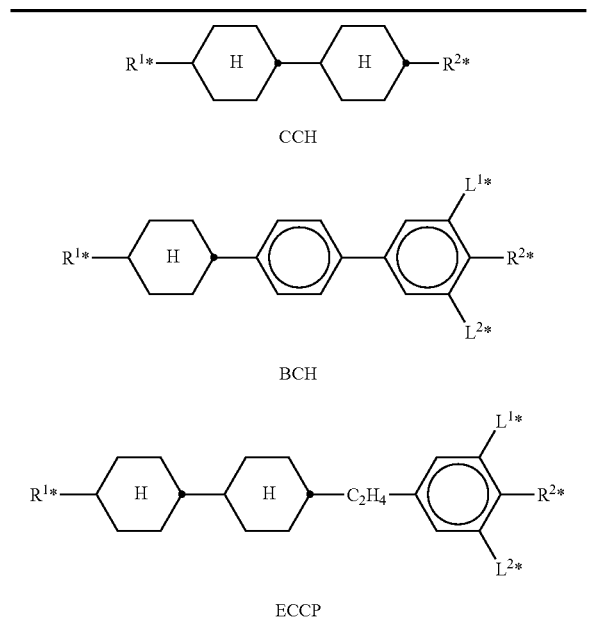
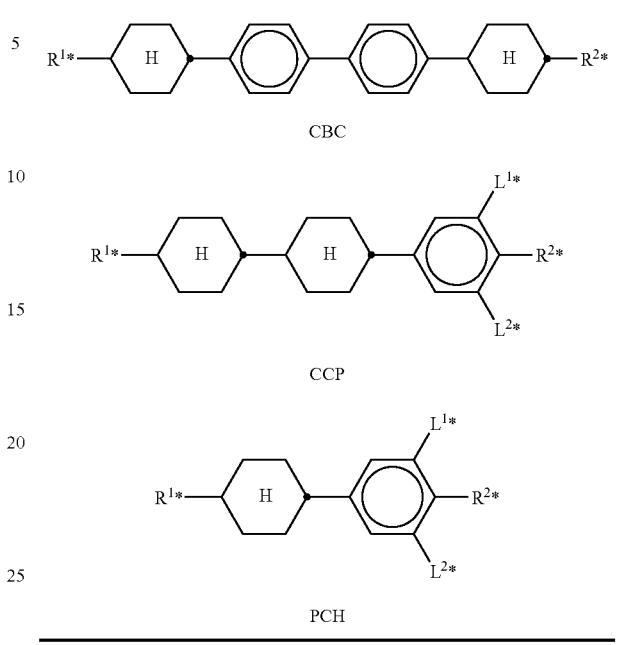
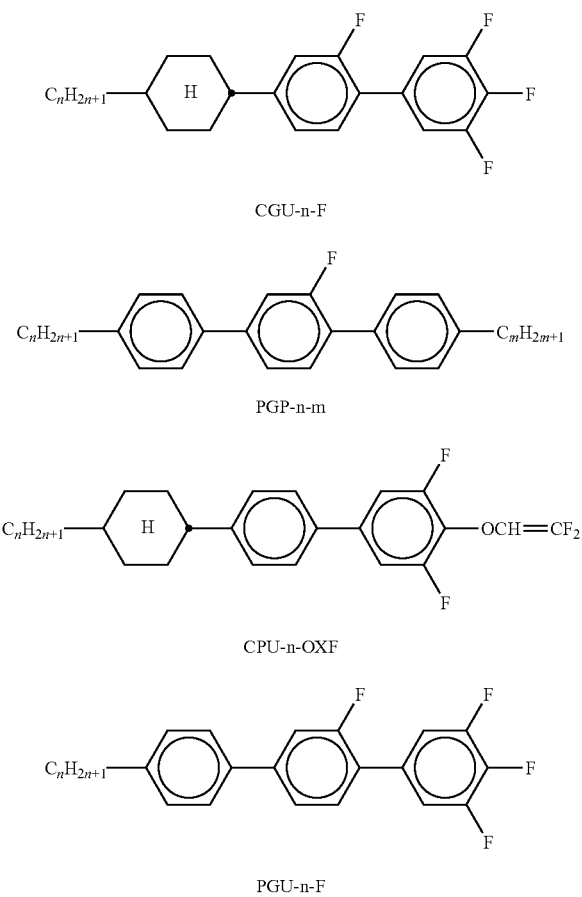

TABLE B-continued
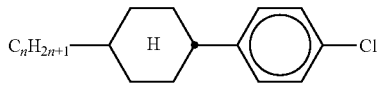
CP-n-Cl
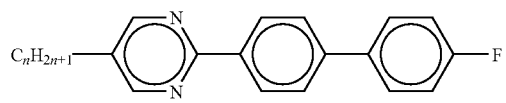
MPP-n-F
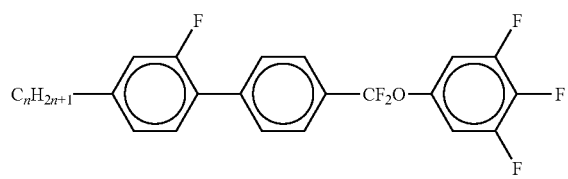
GPQU-n-F
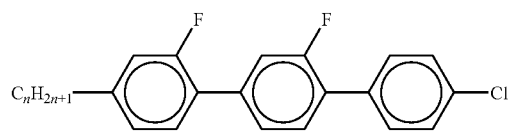
GGP-n-Cl
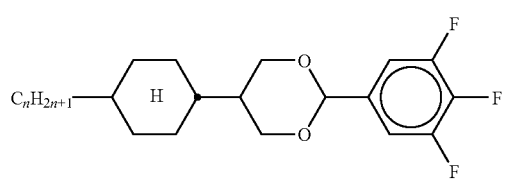
CDU-n-F
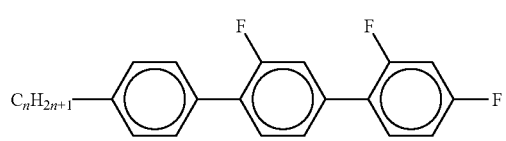
PGIGI-n-F
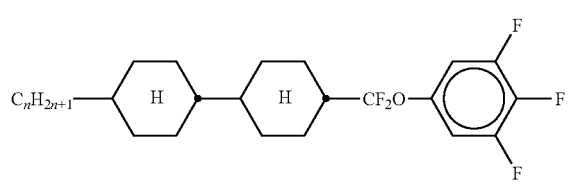
CCQU-n-F
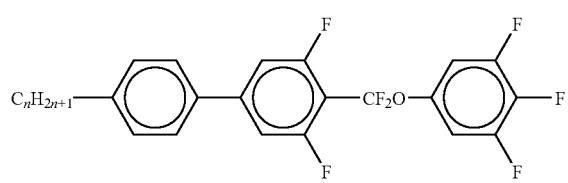
PUQU-n-F TABLE B-continued
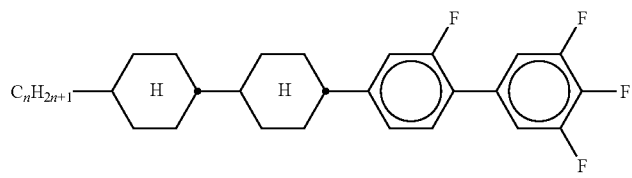
CCGU-n-F
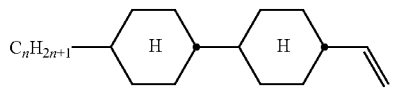
CC-n-V
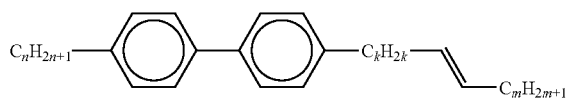
PP-n-kVm
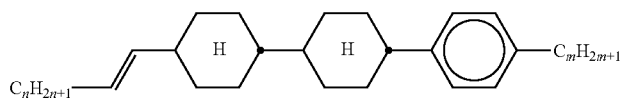
CCP-nV-m
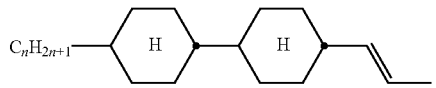
CC-n-V1
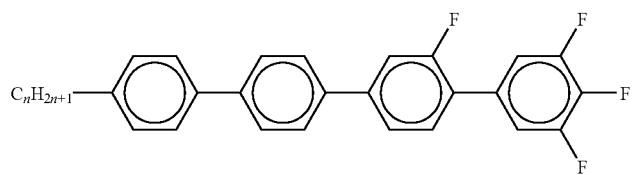
PPGU-n-F
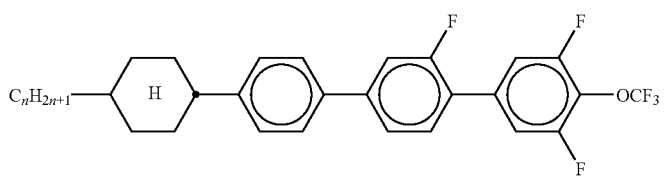
CPGU-n-OT
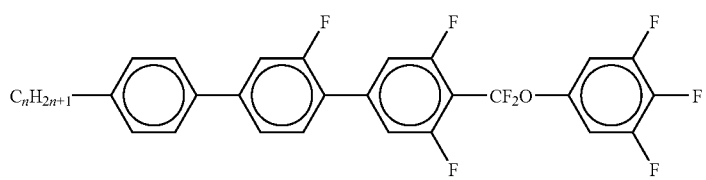
PGUQU-n-F TABLE B-continued

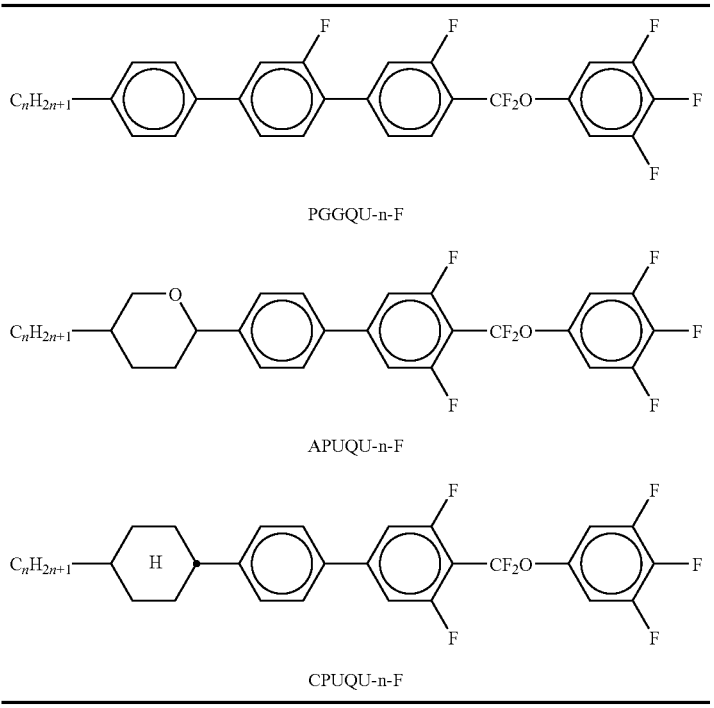

Particular preference is given to liquid-crystalline mixtures which, besides the compounds of the formula I, comprise at least one, two, three, four or more compounds from Table B.

TABLE C

Table C indicates possible dopants which are generally added to the mixtures according to the invention. The mixtures preferably comprise 0-10% by weight, in particular 0.01-5% by weight and particularly preferably 0.01-3% by weight of dopants.

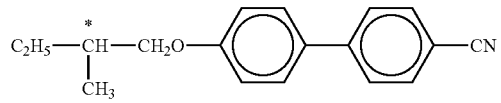

C 15

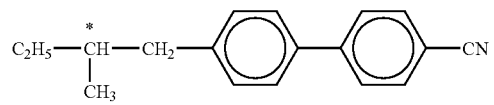

CB 15

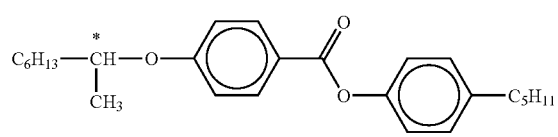

CM 21

TABLE C-continued
Table C indicates possible dopants which are generally added to the mixtures according to the invention. The mixtures preferably comprise 0-10% by weight, in particular 0.01-5% by weight and particularly preferably 0.01-3% by weight of dopants.
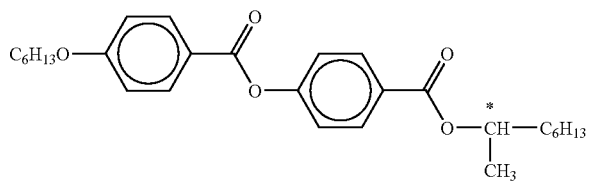
R/S-811
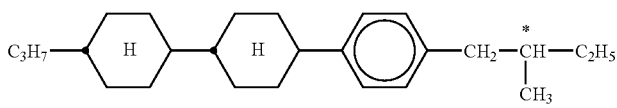
CM 44
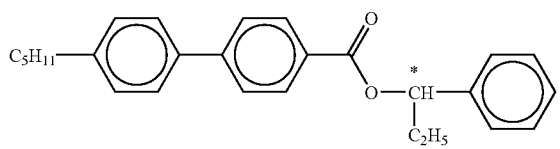
CM 45
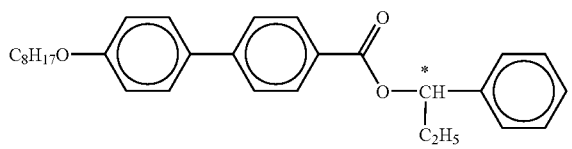
CM 47
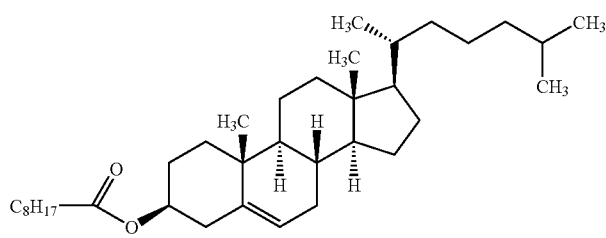
CN
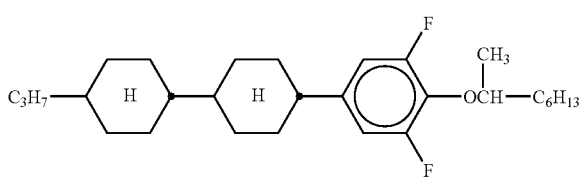
R/S-2011
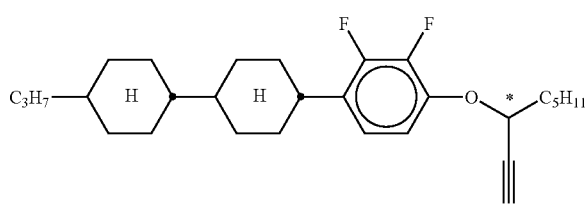

TABLE C-continued

Table C indicates possible dopants which are generally added to the
mixtures according to the invention. The mixtures preferably comprise 0-10% by
weight, in particular 0.01-5% by weight and particularly preferably 0.01-3%
by weight of dopants.

R/S-3011

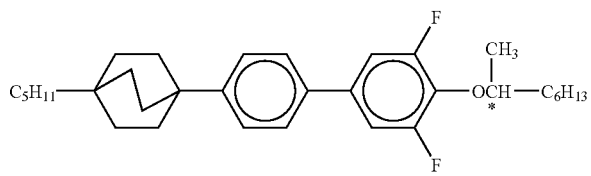

R/S-4011

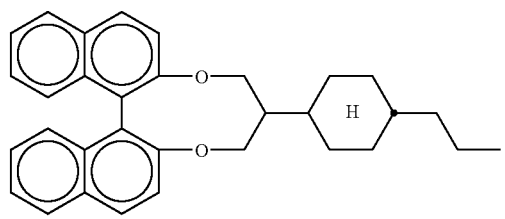

R/S-5011

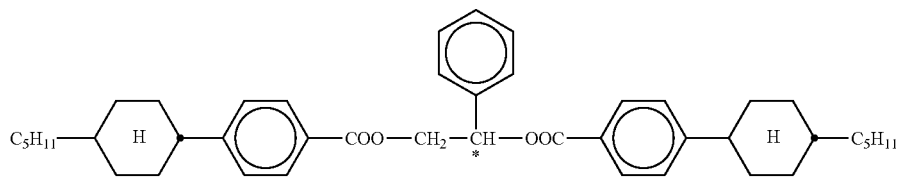

R/S-1011

TABLE D

Stabilisers which can be added, for example, to the mixtures according to
the invention in amounts of 0-10% by weight are mentioned below.

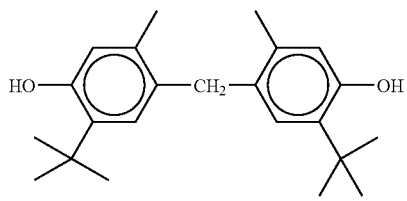

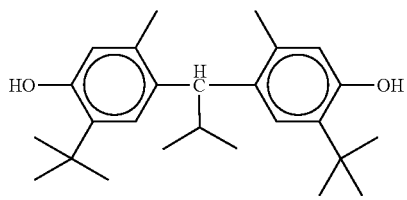

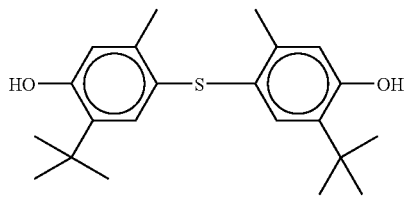

TABLE D-continued
Stabilisers which can be added, for example, to the mixtures according to the invention in amounts of 0-10% by weight are mentioned below.
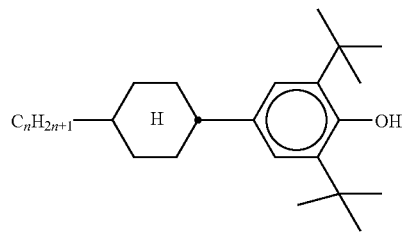
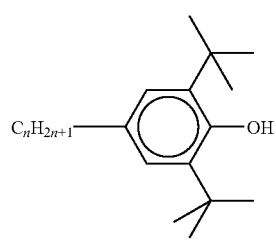
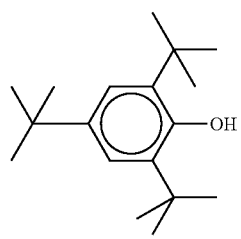
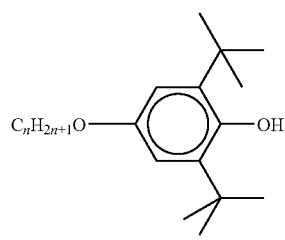
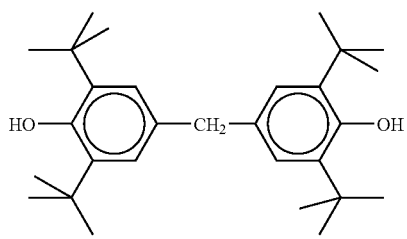
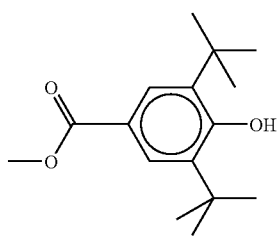

TABLE D-continued
Stabilisers which can be added, for example, to the mixtures according to the invention in amounts of 0-10% by weight are mentioned below.
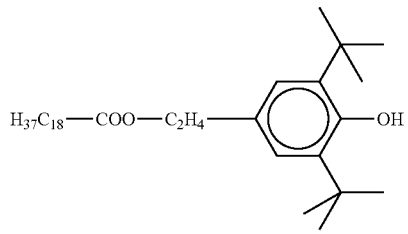
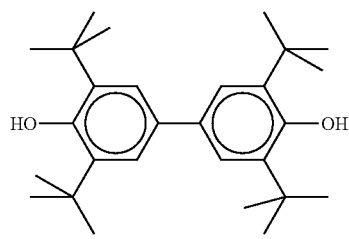
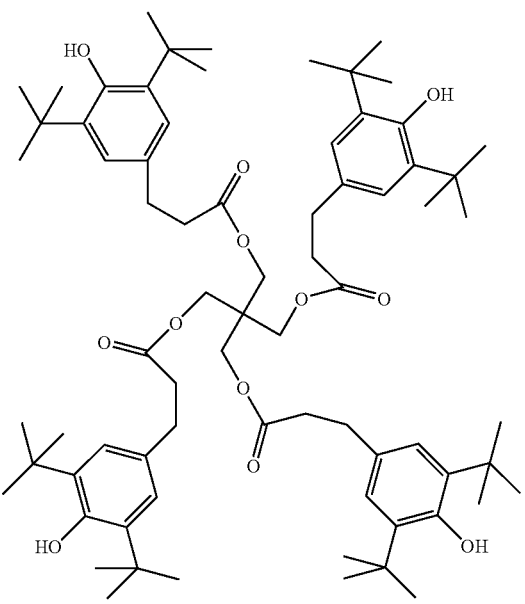
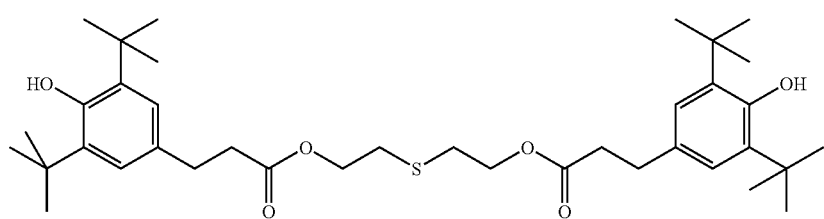

TABLE D-continued
Stabilisers which can be added, for example, to the mixtures according to the invention in amounts of 0-10% by weight are mentioned below.
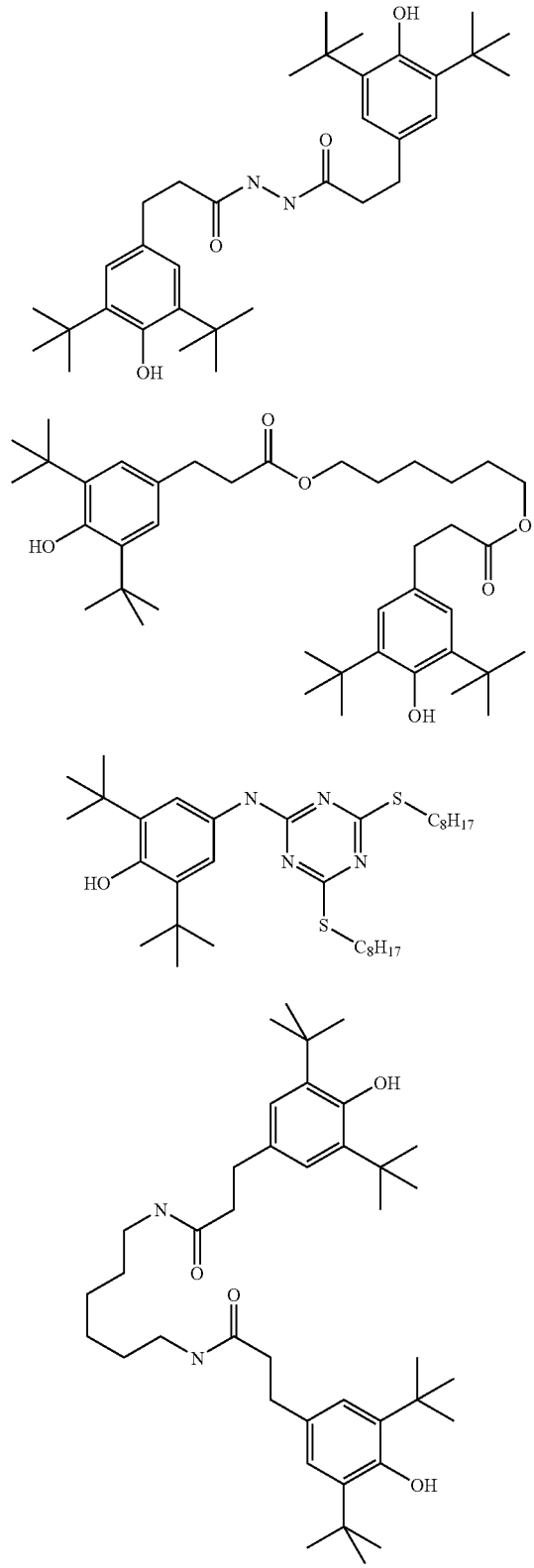

TABLE D-continued
Stabilisers which can be added, for example, to the mixtures according to the invention in amounts of 0-10% by weight are mentioned below.
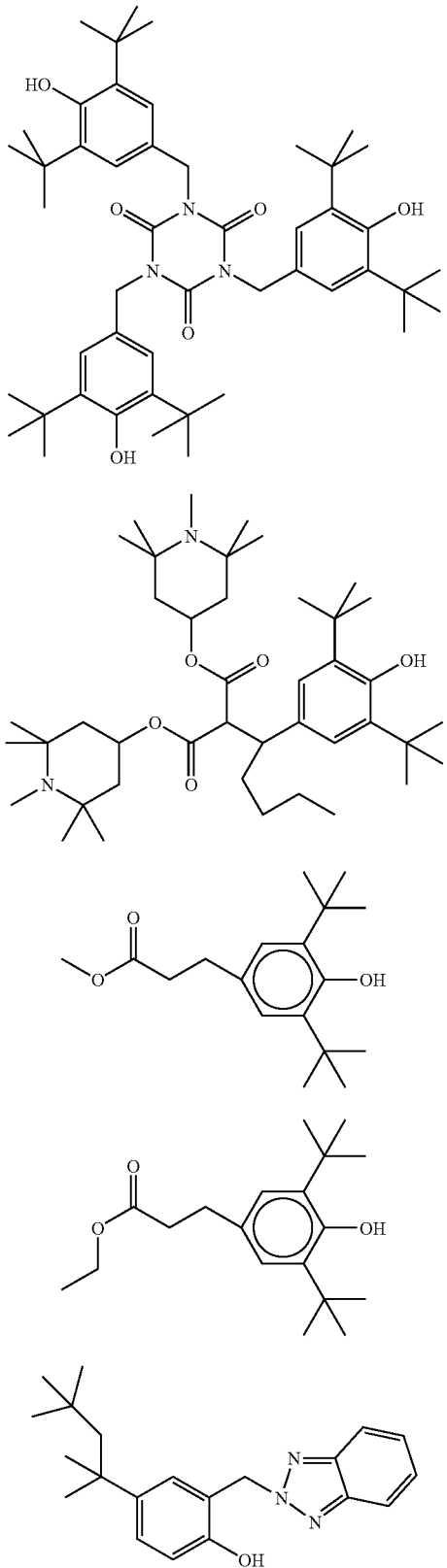

TABLE D-continued
Stabilisers which can be added, for example, to the mixtures according to the invention in amounts of 0-10% by weight are mentioned below.
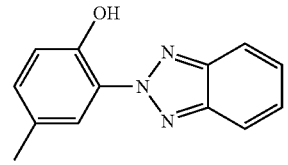
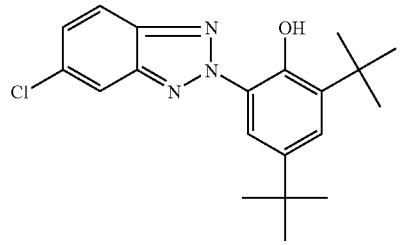
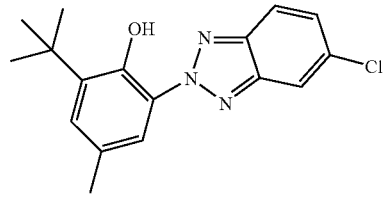
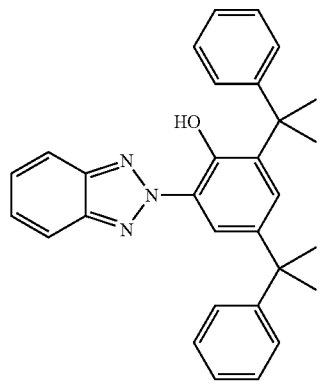
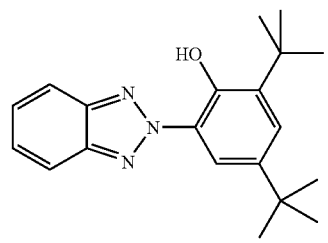
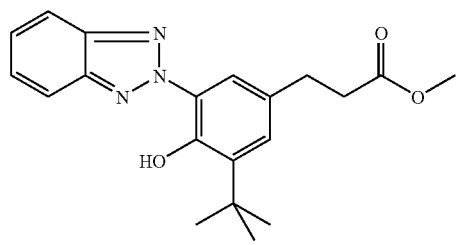

TABLE D-continued
Stabilisers which can be added, for example, to the mixtures according to the invention in amounts of 0-10% by weight are mentioned below.
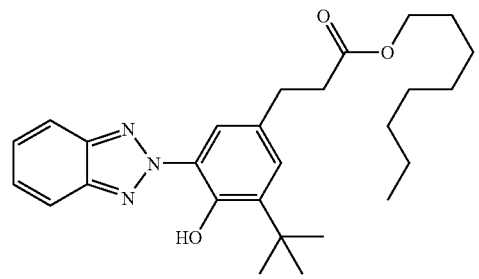
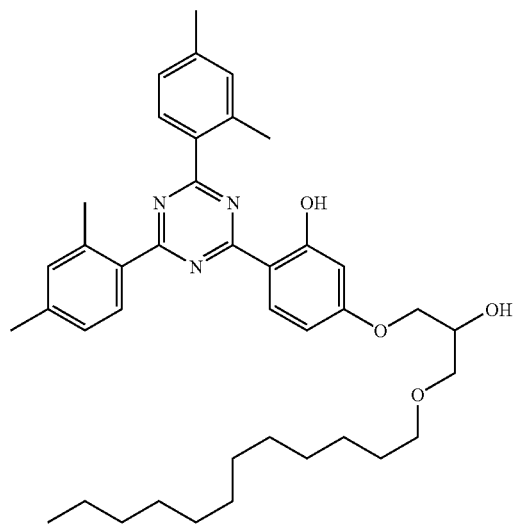
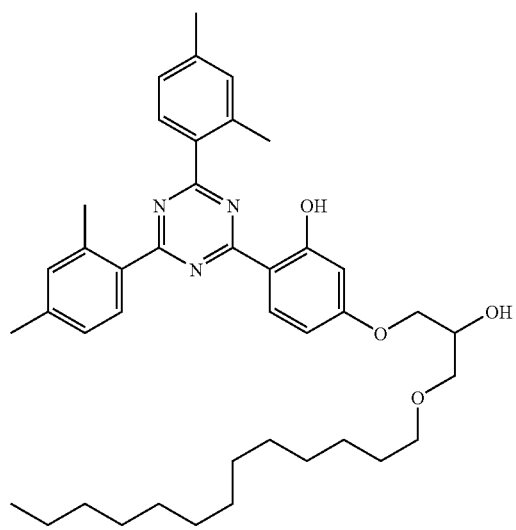

TABLE D-continued

Stabilisers which can be added, for example, to the mixtures according to the invention in amounts of 0-10% by weight are mentioned below.

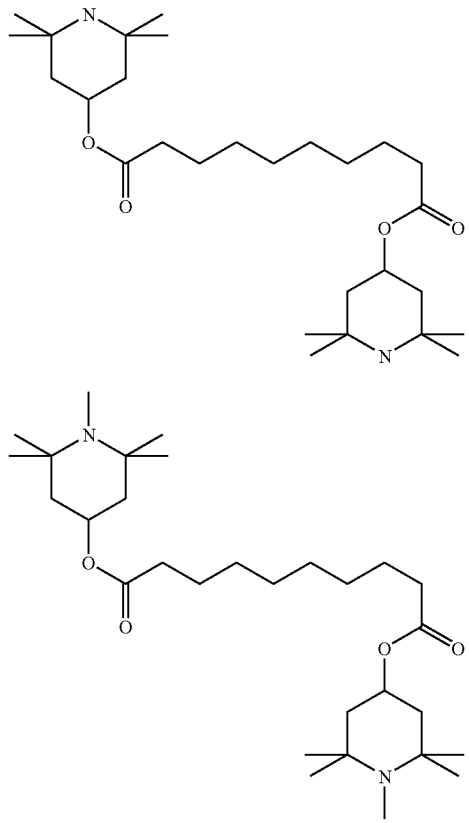

The following examples are intended to explain the invention without limiting it.

Above and below, percentage data denote percent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, Δn denotes the optical anisotropy at 589 nm and 20° C., $\gamma_1$ denotes the rotational viscosity (mPa·s) at 20° C., $V_{10}$ denotes the voltage (V) for a 10% transmission (viewing angle perpendicular to the plate surface), (threshold voltage), $V_{90}$ denotes the voltage (V) for a 90% transmission (viewing angle perpendicular to the plate surface), Δ∈ denotes the dielectric anisotropy at 20° C. and 1 kHz (Δ∈=∈$_{\parallel}$−∈$_{\perp}$, where ∈$_{\parallel}$ denotes the dielectric constant parallel to the longitudinal axes of the molecules and ∈$_{\perp}$ denotes the dielectric constant perpendicular thereto).

The electro-optical data are measured in a TN cell at the 1st minimum (i.e. at a d·Δn value of 0.5 μm) at 20° C., unless expressly indicated otherwise. The optical data are measured at 20° C., unless expressly indicated otherwise. All physical properties are determined in accordance with "Merck Liquid Crystals, Physical Properties of Liquid Crystals", status November 1997, Merck KGaA, Germany, and apply for a temperature of 20° C., unless explicitly indicated otherwise.

COMPARATIVE EXAMPLE 1

| | | | |
|---|---|---|---|
| CC-3-V | 37.00% | Clearing point [° C.]: | 75.0 |
| PP-1-2V1 | 7.00% | Δn [589 nm, 20° C.]: | 0.1152 |
| PUQU-3-F | 15.00% | Δ∈ [kHz, 20° C.]: | +5.0 |
| CGU-3-F | 3.00% | $\gamma_1$ [mPa · s, 20° C.]: | 59 |
| PGP-2-3 | 5.00% | $V_{10}$ [V]: | 1.88 |
| PGP-2-4 | 7.00% | $V_{90}$ [V]: | 2.82 |
| CCP-V-1 | 18.00% | | |
| CCGU-3-F | 8.00% | | |

EXAMPLE 1

| | | | |
|---|---|---|---|
| CC-3-V | 40.00% | Clearing point [° C.]: | 75.5 |
| PP-1-2V1 | 7.50% | Δn [589 nm, 20° C.]: | 0.1165 |
| PUQU-3-F | 14.50% | Δ∈ [kHz, 20° C.]: | +4.9 |
| PGP-2-3 | 5.00% | $\gamma_1$ [mPa · s, 20° C.]: | 57 |
| PGP-2-4 | 5.00% | $V_{10}$ [V]: | 1.94 |
| CCP-V-1 | 18.00% | $V_{90}$ [V]: | 2.89 |
| PGGQU-3-F | 7.00% | | |
| CBC-33 | 3.00% | | |

The mixture has lower viscosity compared with the mixture from Comparative Example 1 with the same birefringence and the same clearing point.

EXAMPLE 2

| | | | |
|---|---|---|---|
| CC-3-V | 36.00% | Clearing point [° C.]: | 74.5 |
| CC-3-V1 | 7.00% | Δn [589 nm, 20° C.]: | 0.1358 |
| PP-1-2V1 | 7.50% | Δε [kHz, 20° C.]: | +4.8 |
| PGU-3-F | 8.50% | $\gamma_1$ [mPa · s, 20° C.]: | 58 |
| PUQU-3-F | 3.00% | $V_{10}$ [V]: | 2.02 |
| PGP-2-3 | 6.00% | $V_{90}$ [V]: | 2.95 |
| PGP-2-4 | 6.00% | | |
| PGP-2-5 | 8.00% | | |
| CCP-V-1 | 8.00% | | |
| PGUQU-3-F | 9.00% | | |
| CBC-33 | 1.00% | | |

EXAMPLE 3

| | | | |
|---|---|---|---|
| CC-3-V | 46.00% | Clearing point [° C.]: | 73.0 |
| CP-3-Cl | 7.00% | Δn [589 nm, 20° C.]: | 0.1344 |
| PUQU-3-F | 3.00% | Δε [kHz, 20° C.]: | +4.7 |
| PGP-2-3 | 5.00% | $\gamma_1$ [mPa · s, 20° C.]: | 55 |
| PGP-2-4 | 5.00% | $V_{10}$ [V]: | 1.93 |
| PGP-2-5 | 6.00% | $V_{90}$ [V]: | 2.85 |
| MPP-3-F | 7.00% | | |
| MPP-5-F | 7.00% | | |
| GGP-3-Cl | 5.00% | | |
| CCP-V-1 | 3.00% | | |
| PGUQU-3-F | 6.00% | | |

EXAMPLE 4

| | | | |
|---|---|---|---|
| CC-3-V | 38.00% | Clearing point [° C.]: | 74.5 |
| CC-3-V1 | 5.00% | Δn [589 nm, 20° C.]: | 0.1362 |
| PP-1-2V1 | 7.00% | Δε [kHz, 20° C.]: | +5.1 |
| PGU-3-F | 9.00% | $\gamma_1$ [mPa · s, 20° C.]: | 59 |
| PUQU-3-F | 3.00% | $V_{10}$ [V]: | 1.94 |
| PGP-2-3 | 5.00% | $V_{90}$ [V]: | 2.84 |
| PGP-2-4 | 6.00% | | |
| PGP-2-5 | 8.00% | | |
| CCP-V-1 | 9.00% | | |
| PGUQU-3-F | 8.00% | | |
| PPGU-3-F | 2.00% | | |

EXAMPLE 5

| | | | |
|---|---|---|---|
| CC-3-V | 39.50% | Clearing point [° C.]: | 70.0 |
| CC-3-V1 | 6.00% | Δn [589 nm, 20° C.]: | 0.1274 |
| PP-1-2V1 | 7.00% | Δε [kHz, 20° C.]: | +4.7 |
| PGU-3-F | 7.00% | $\gamma_1$ [mPa · s, 20° C.]: | 53 |
| PUQU-3-F | 4.50% | $V_{10}$ [V]: | 1.96 |
| PGP-2-3 | 5.00% | $V_{90}$ [V]: | 2.87 |
| PGP-2-4 | 6.00% | | |
| PGP-2-5 | 7.00% | | |
| CCP-V-1 | 9.00% | | |
| PGUQU-3-F | 9.00% | | |

EXAMPLE 6

| | | | |
|---|---|---|---|
| CC-3-V | 39.00% | Clearing point [° C.]: | 71.5 |
| CC-3-V1 | 6.50% | Δn [589 nm, 20° C.]: | 0.1284 |
| PP-1-2V1 | 7.00% | Δε [kHz, 20° C.]: | +4.7 |
| PGU-3-F | 5.50% | $\gamma_1$ [mPa · s, 20° C.]: | 51 |
| PUQU-3-F | 3.00% | $V_{10}$ [V]: | 1.99 |
| CPU-3-OXF | 8.00% | $V_{90}$ [V]: | 2.90 |
| PGP-2-3 | 5.00% | | |
| PGP-2-4 | 6.00% | | |
| PGP-2-5 | 6.50% | | |
| CCP-V-1 | 5.50% | | |
| PGUQU-3-F | 8.00% | | |

EXAMPLE 7

| | | | |
|---|---|---|---|
| CC-3-V | 39.00% | Clearing point [° C.]: | 70.5 |
| CC-3-V1 | 6.50% | Δn [589 nm, 20° C.]: | 0.1290 |
| PP-1-2V1 | 7.00% | Δε [kHz, 20° C.]: | +4.8 |
| PGU-3-F | 5.50% | $\gamma_1$ [mPa · s, 20° C.]: | 56 |
| PUQU-3-F | 3.00% | $V_{10}$ [V]: | 1.95 |
| CPU-3-OXF | 8.00% | $V_{90}$ [V]: | 2.87 |
| PGP-2-3 | 5.00% | | |
| PGP-2-4 | 6.00% | | |
| PGP-2-5 | 6.50% | | |
| CCP-V-1 | 5.50% | | |
| APUQU-3-F | 3.00% | | |
| PGUQU-3-F | 8.00% | | |

EXAMPLE 8

| | | | |
|---|---|---|---|
| CC-3-V | 41.00% | Clearing point [° C.]: | 70.5 |
| CC-3-V1 | 7.00% | Δn [589 nm, 20° C.]: | 0.1276 |
| PP-1-2V1 | 6.50% | Δε [kHz, 20° C.]: | +4.9 |
| PGU-3-F | 5.50% | $\gamma_1$ [mPa · s, 20° C.]: | 54 |
| PUQU-3-F | 3.00% | $V_{10}$ [V]: | 1.92 |
| PGP-2-3 | 6.00% | $V_{90}$ [V]: | 2.81 |
| PGP-2-4 | 6.00% | | |
| PGP-2-5 | 8.00% | | |
| CCP-V-1 | 5.00% | | |
| APUQU-3-F | 3.00% | | |
| PGUQU-3-F | 9.00% | | |

The preceding examples can be repeated with similar success by substituting the generically or specifically described reactants and/or operating conditions of this invention for those used in the preceding examples.

The entire disclosures of all applications, patents and publications, cited herein and of corresponding German application No. 10 2006 046 907.0, filed Oct. 4, 2006, and German application No. 10 2007 007 143.6, filed Feb. 9, 2007 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystalline medium, comprising a compound of formula I

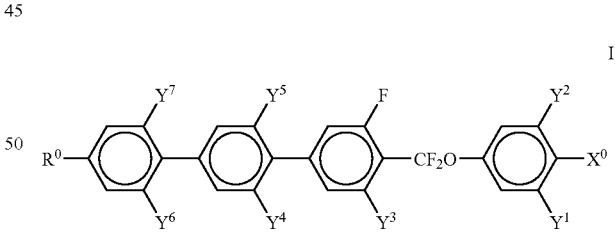

in which $R^0$ denotes a halogenated or unsubstituted alkyl or alkoxy radical having 1 to 15 C atoms, in which one or more $CH_2$ groups are optionally, independently of one another, replaced by —C≡C—, —$CF_2O$—, —CH═CH—,

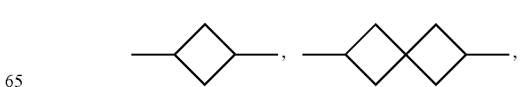

—O—, —CO—O— or —O—CO— in such a way that O atoms are not linked directly to one another, X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms, and $Y^{1-7}$ each, independently of one another, denote H or F, with provisos that either $Y^3$ is H or $Y^4$ and $Y^5$ are H, or $Y^1$ and $Y^2$ are H; and further comprising a compound of formula XIII

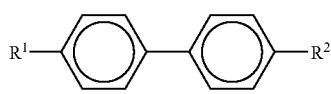
XIII in which $R^1$ $R^2$ each, independently of one another, denote n-alkyl, alkoxy, oxaalkyl, flouroalkyl or alkenyl, each having up to 9 C atoms, where at least one of the radicals $R^1$ and $R^2$ denotes alkenyl having 2 to 7 C atoms.

2. A liquid-crystalline medium according to claim 1, comprising a compound of formula Ia, Ic, Id, or Ie

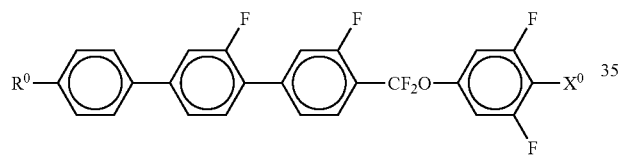
Ia

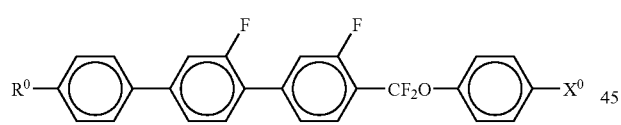
Ic

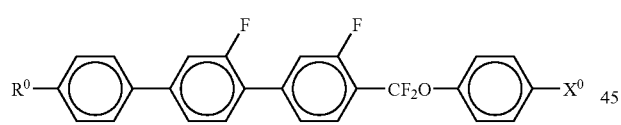
Id

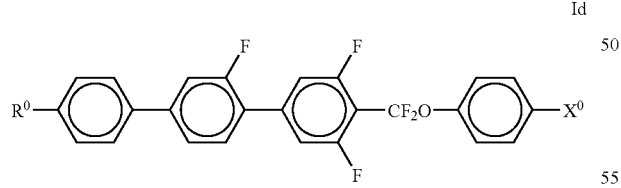
Ie

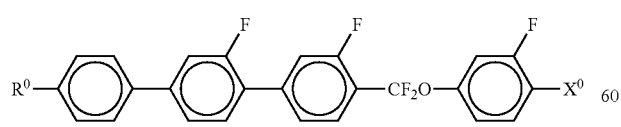

in which $R^0$ and $X^0$ have the meaning indicated for compounds of formula I.

3. A liquid-crystalline medium according to claim 1, further comprising a compound of formula II or III:

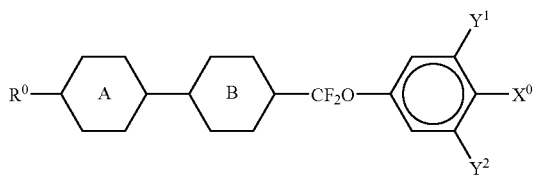
II

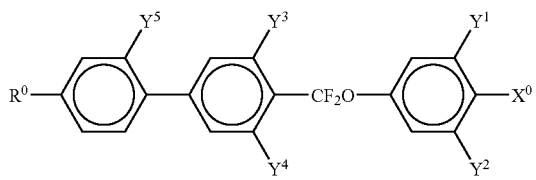
III in which $R^0$ denotes a halogenated or unsubstituted alkyl or alkoxy radical having 1 to 15 C atoms, in which one or more CH₂ groups are optionally, independently of one another, replaced by —C≡C—, —CF₂O—, —CH=CH—,

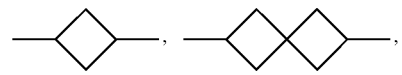

—O—, —CO—O— or —O—CO— in such a way that O atoms are not linked directly to one another, X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms, $Y^{1-5}$ each, independently of one another, denote H or F, and

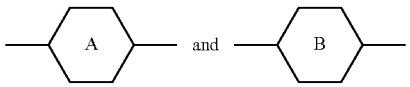

each, independently of one another, denote

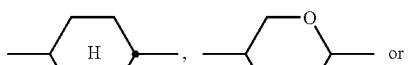

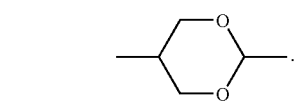

4. A liquid-crystalline medium according to claim 1, further comprising a compound of formula IV, V, VI, VII or VIII

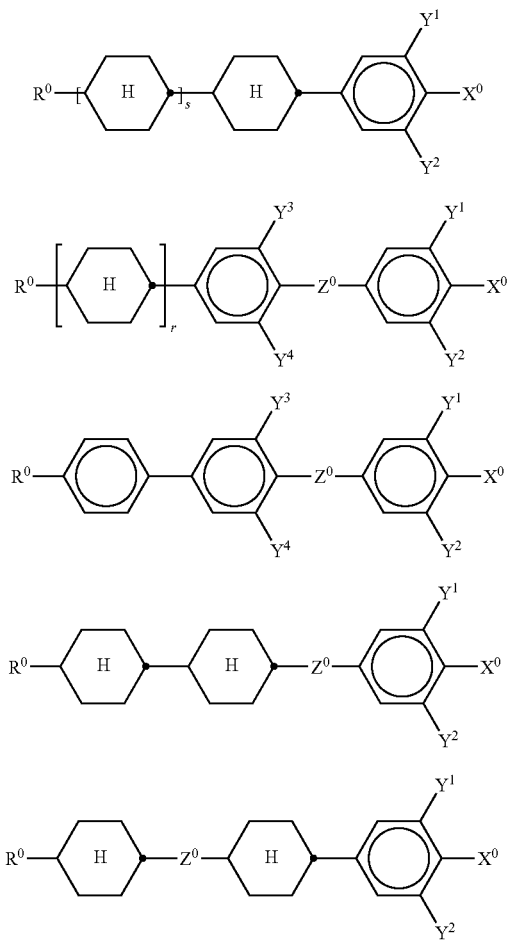

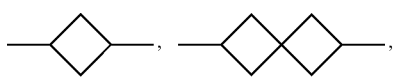

in which
R⁰ denotes a halogenated or unsubstituted alkyl or alkoxy radical having 1 to 15 C atoms, in which one or more CH₂ groups are optionally, independently of one another, replaced by —C≡C—, —CF₂O—, —CH=CH—, —O—, —CO—O— or —O—CO— in such a way that O atoms are not linked directly to one another, X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms, Y¹⁻⁴ each, independently of one another, denote H or F, Z⁰ denotes —C₂H₄—, —(CH₂)₄—, —CH=CH—, —CF=CF—, —C₂F₄—, —CH₂CF₂—, —CF₂CH₂—, —CH₂O—, —OCH₂—, —COO— or —OCF₂—, in formulae V and VI also a single bond, in formulae V and VIII also —CF₂O—, r denotes 0 or 1, and s denotes 0 or 1.

5. A liquid-crystalline medium according to claim 1, further comprising a compound of formula IX, X, XI or XII

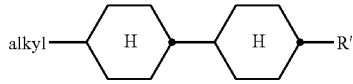

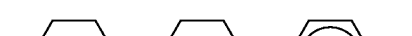

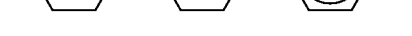

in which
X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms, L denotes H or F, "alkyl" denotes C₁₋₇-alkyl, R' denotes C₁₋₇-alkyl, C₁₋₆-alkoxy or C₂₋₇-alkenyl, and "alkenyl" and "alkenyl*" each, independently of one another, denote C₂₋₇-alkenyl.

6. A liquid-crystalline medium according to claim 1, further comprising compound of formula XVII

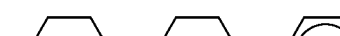

in which
R¹ and R² each, independently of one another, denote n-alkyl, alkoxy, oxaalkyl, fluoroalkyl or alkenyl, each having up to 9 C atoms, and L denotes H or F.

7. A liquid-crystalline medium according to claim 3, comprising
2-30% by weight of a compound of formula I, 10-60% by weight of a compound of formulae II or III,
20-70% by weight of a compound of formulae IX, X, XI, XII or XIII,

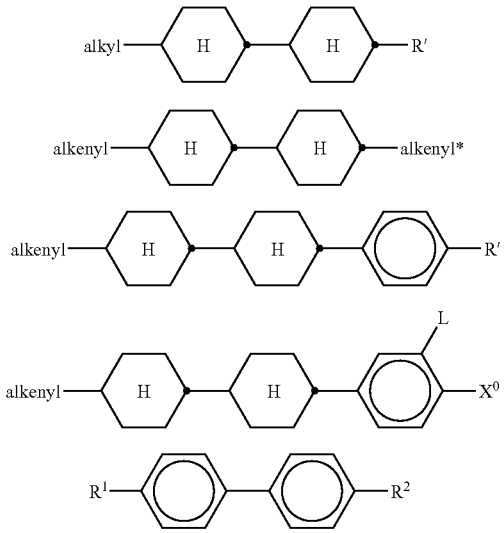

in which $X_0$ denotes F, Cl, CN, $SF_5$, SCN, NCS, a halogenated alkyl radical, a halogenated alkenyl radical, a halogenated alkoxy radical or a halogenated alkenyloxy radical having up to 6 C atoms, L denotes H or F, "alkyl" denotes $C_{1-7}$-alkyl, R' denotes $C_{1-7}$-alkyl, $C_{1-6}$-alkoxy or $C_{2-7}$-alkenyl, and "alkenyl" and "alkenyl*" each, independently of one another, denote $C_{2-7}$-alkenyl, $R^1$ and $R^2$ each, independently of one another, denote n-alkyl, alkoxy, oxaalkyl, fluoroalkyl or alkenyl, each having up to 9 C atoms, where at least one of the radicals $R^1$ and $R^2$ denotes alkenyl having 2 to 7 C atoms, and, 4-30% by weight of a compound of formula XVII

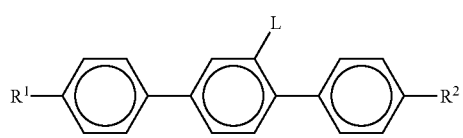

in which $R^1$ and $R^2$ each, independently of one another, denote n-alkyl, alkoxy, oxaalkyl, fluoroalkyl or alkenyl, each having up to 9 C atoms, and L denotes H or F.

8. A process for preparing a liquid-crystalline medium according to claim 1, comprising mixing together a compound of formula I and a compound of formula XIII with further liquid-crystalline compounds and/or additives.

9. An electro-optical apparatus, comprising a liquid-crystalline medium according to claim 1.

10. An electro-optical liquid-crystal display containing a liquid-crystalline medium according to claim 1.

11. A liquid-crystalline medium according to claim 1, which has a nematic phase down to −20° C., a clearing point ≧70° C., and a rotational viscosities $\gamma_1$ of ≦90 mPa·s.

12. A liquid-crystalline medium according to claim 1, which has a dielectric anisotropy $\Delta\epsilon$ of ≧+3.

13. A liquid-crystalline medium according to claim 1, which has a threshold voltage of ≦2.0 V.

14. A liquid-crystalline medium according to claim 1, which has a birefringence $\Delta n$ of ≧0.10.

15. A liquid-crystalline medium according to claim 1, which has a nematic phase range of 90°.

16. A liquid-crystalline medium according to claim 1, which has a nematic phase range of −25° to +70°C.

17. A method for increasing the light and/or UV stability of a liquid-crystalline medium comprising adding a compound of formula I and a compound of formula XIII to said liquid-crystalline medium to form a liquid-crystalline medium according to claim 1.

18. A liquid-crystalline medium, comprising a compound of formula I

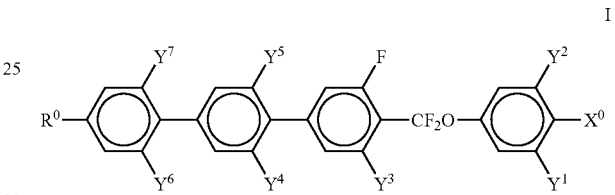

in which $R^0$ denotes a halogenated or unsubstituted alkyl or alkoxy radical having 1 to 15 C atoms, in which one or more $CH_2$ groups are optionally, independently of one another, replaced by —C≡C—, —$CF_2$O—, —CH=CH—,

—O—, —CO—O— or —O—CO— in such a way that O atoms are not linked directly to one another, $X^0$ denotes F, Cl, CN, $SF_5$, SCN, NCS, a halogenated alkyl radical, a halogenated alkenyl radical, a halogenated alkoxy radical or a halogenated alkenyloxy radical having up to 6 C atoms, and $Y^{1-7}$ each, independently of one another, denote H or F with provisos that either $Y^3$ is H or $Y^4$ and $Y^5$ are H, or $Y^1$ $Y^2$ are H; and further comprising a compound of formula XVII

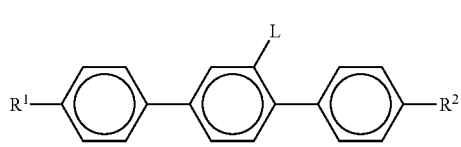

in which $R^1$ and $R^2$ each, independently of one another, denote n-alkyl, alkoxy, oxaalkyl, fluoroalkyl or alkenyl, each having up to 9 C atoms, and L denotes H or F.

19. A liquid-crystalline medium according to claim 18, wherein in the compound of formula XVII, L is F.

20. A liquid-crystalline medium according to claim 18, wherein in the compound of formula XVII, L is F and $R^1$ and $R^2$ are each independently n-alkyl.

21. A liquid-crystalline medium according to claim 18, wherein in the compound of formula XVII, L is F, $R^1$ is alkenyl and $R^2$ is n-alkyl.

22. A liquid-crystalline medium according to claim 18, wherein in the compound of formula XVII, L is F, $R^1$ is n-alkyl and $R^2$ is alkenyl.

23. A liquid-crystalline medium according to claim 18, wherein in the compound of formula XVII, L is F, $R^1$ is $C_2H_5$ and $R^2$ is $C_3H_7$, $C_4H_9$ or $C_5H_{11}$.

24. A liquid-crystalline medium according to claim 18, comprising a compound of formula Ia, Ic, Id or Ie

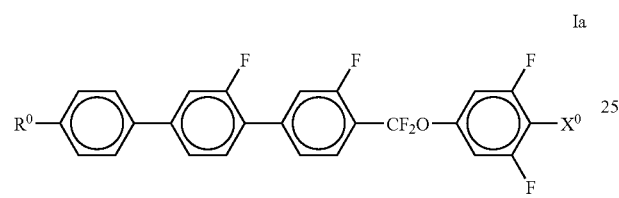

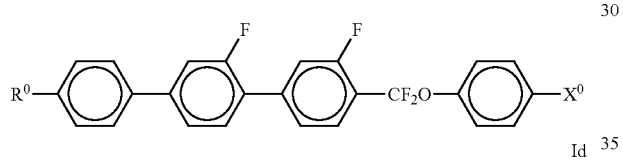

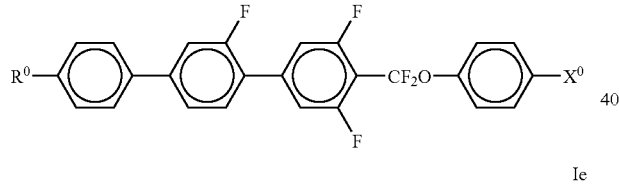

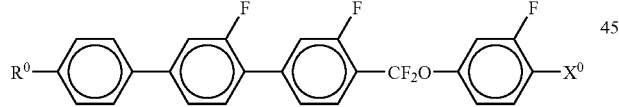

in which $R^0$ and $X^0$ have the meaning indicated for compounds of formula I.

25. A liquid-crystalline medium according to claim 18, further comprising a compound of formula II or III:

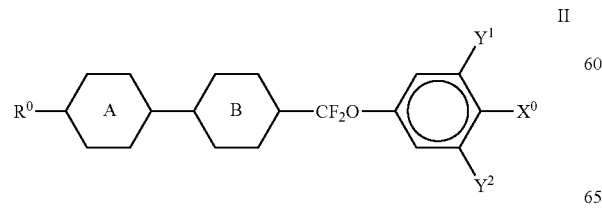

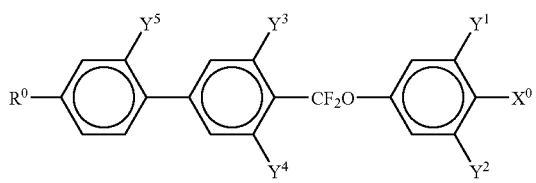

in which $R^0$ denotes a halogenated or unsubstituted alkyl or alkoxy radical having 1 to 15 C atoms, in which one or more $CH_2$ groups are optionally, independently of one another, replaced by —C≡C—, —$CF_2$O—, —CH=CH—,

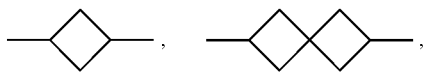

—O—, —CO—O— or —O—CO— in such a way that O atoms are not linked directly to one another, $X^0$ denotes F, Cl, CN, $SF_5$, SCN, NCS, a halogenated alkyl radical, a halogenated alkenyl radical, a halogenated alkoxy radical or a halogenated alkenyloxy radical having up to 6 C atoms, $Y^{1-5}$ each, independently of one another, denote H or F, and

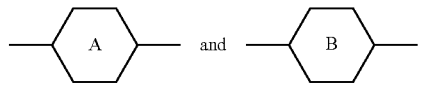

each, independently of one another, denote

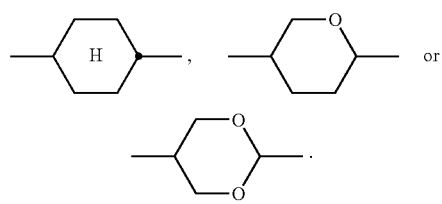

26. A liquid-crystalline medium according to claim 18, further comprising a compound of formula IV, V, VI, VII or VIII:

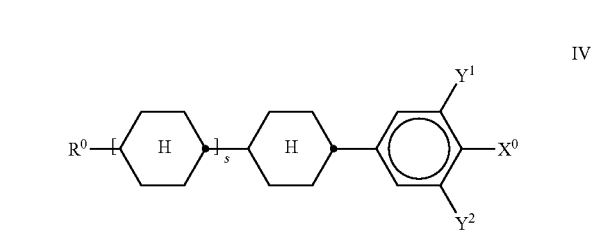

-continued

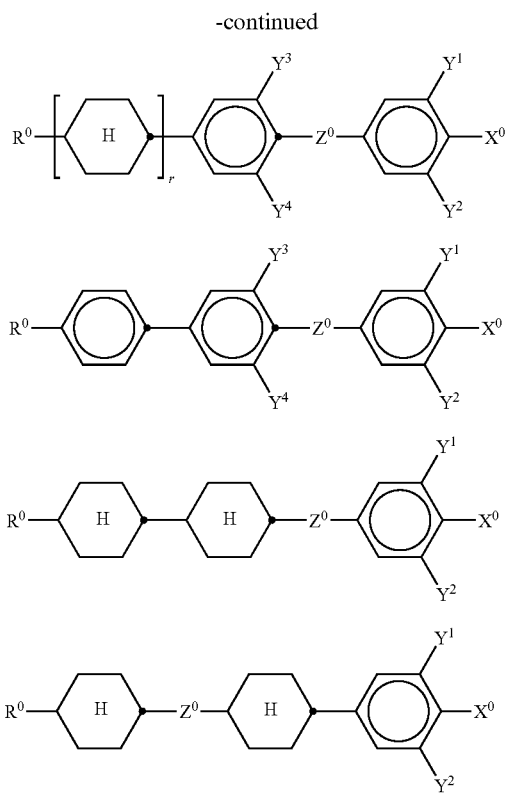

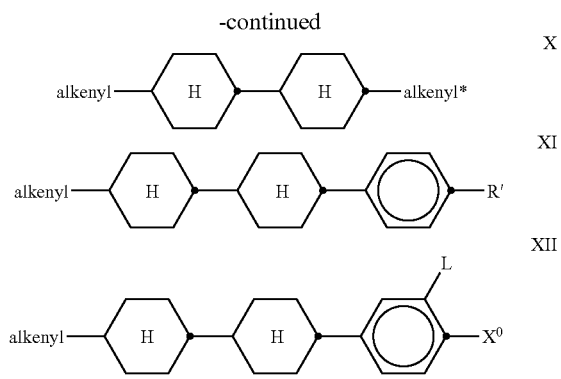

in which
R⁰ denotes a halogenated or unsubstituted alkyl or alkoxy radical having 1 to 15 C atoms, in which one or more CH₂ groups are optionally, independently of one another, replaced by —C≡C—, —CF₂O—, —CH=CH—,

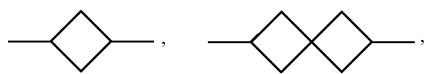

—O—, —CO—O— or —O—CO— in such a way that O atoms are not linked directly to one another,
X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms,
$Y^{1-4}$ each, independently of one another, denote H or F,
Z⁰ denotes —C₂H₄—, —(CH₂)₄—, —CH=CH—, —CF=CF—, —C₂F₄—, —CH₂CF₂—, —CF₂CH₂—, —CH₂O—, —OCH₂—, —COO— or —OCF₂—, in formulae V and VI also a single bond, in formulae V and VIII also —CF₂O—,
r denotes 0 or 1, and
s denotes 0 or 1.

27. A liquid-crystalline medium according to claim 18, further comprising a compound of formula IX, X, XI or XII:

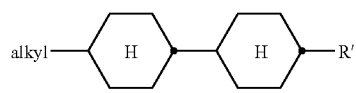

in which
X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms,
L denotes H or F,
"alkyl" denotes $C_{1-7}$-alkyl,
R' denotes $C_{1-7}$-alkyl, $C_{1-6}$-alkoxy or $C_{2-7}$-alkenyl, and
"alkenyl" and "alkenyl*" each, independently of one another, denote $C_{2-7}$-alkenyl.

28. A liquid-crystalline medium according to claim 18, further comprising compound of formula XIII

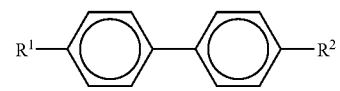

in which
R¹ and R² each, independently of one another, denote n-alkyl, alkoxy, oxaalkyl, fluoroalkyl or alkenyl, each having up to 9 C atoms,
where at least one of the radicals R¹ and R² denotes alkenyl having 2 to 7 C atoms.

29. A liquid-crystalline medium according to claim 25, comprising
2-30% by weight of a compound of formula I,
10-60% by weight of a compound of formulae II or III,
20-70% by weight of a compound of formulae IX, X, XI, XII or XIII,

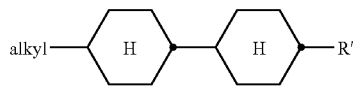

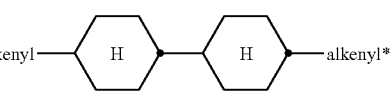

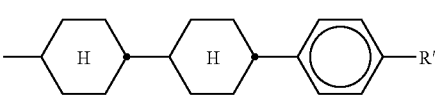

-continued

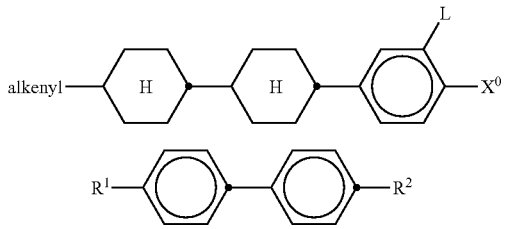

in which
X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms,
L denotes H or F,
"alkyl" denotes $C_{1-7}$-alkyl,
R' denotes $C_{1-7}$-alkyl, $C_{1-6}$-alkoxy or $C_{2-7}$-alkenyl, and
"alkenyl" and "alkenyl*" each, independently of one another, denote $C_{2-7}$-alkenyl,
$R^1$ and $R^2$ each, independently of one another, denote n-alkyl, alkoxy, oxaalkyl, fluoroalkyl or alkenyl, each having up to 9 C atoms, where at least one of the radicals $R^1$ and $R^2$ denotes alkenyl having 2 to 7 C atoms, and,
4-30% by weight of the compound of formula XVII.

30. A process for preparing a liquid-crystalline medium according to claim 18, comprising mixing together a compound of formula I and a compound of formula XVII with further liquid-crystalline compounds and/or additives.

31. An electro-optical apparatus, comprising a liquid-crystalline medium according to claim 18.

32. An electro-optical liquid-crystal display containing a liquid-crystalline medium according to claim 18.

33. A liquid-crystalline medium according to claim 18, which has a nematic phase down to −20° C., a clearing point ≧70° C., and a rotational viscosities γ₁ of ≦90 mPa·s.

34. A liquid-crystalline medium according to claim 18, which has a dielectric anisotropy Δ∈ of ≧+3.

35. A liquid-crystalline medium according to claim 18, which has a threshold voltage of ≦2.0 V.

36. A liquid-crystalline medium according to claim 18, which has a birefringence Δn of ≧0.10.

37. A liquid-crystalline medium according to claim 18, which has a nematic phase range of 90°.

38. A liquid-crystalline medium according to claim 18, which has a nematic phase range of −25° to 70° C.

39. A method for increasing the light and/or UV stability of a liquid-crystalline medium comprising adding a compound of formula I and a compound of formula XVII to said liquid-crystalline medium to form a liquid-crystalline medium according to claim 18.

40. A liquid-crystalline medium, comprising:
2-30% by weight of a compound of formula I

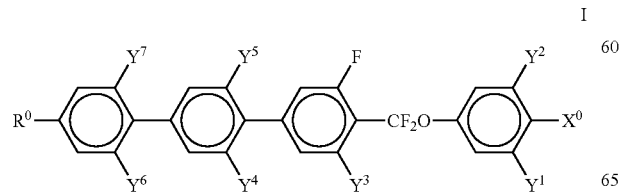

in which
R⁰ denotes a halogenated or unsubstituted alkyl or alkoxy radical having 1 to 15 C atoms, in which one or more CH₂ groups are optionally, independently of one another, replaced by —C≡C—, —CF₂O—, —CH=CH—,

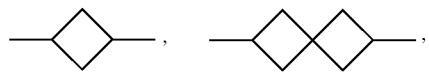

—O—, —CO—O— or —O—CO— in such a way that O atoms are not linked directly to one another,
X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms, and
$Y^{1-7}$ each, independently of one another, denote H or F with provisos that either Y³ is H or Y⁴ and Y⁵ are H, or Y¹ and Y² are H;
10-60% by weight of a compound of formula II or III:

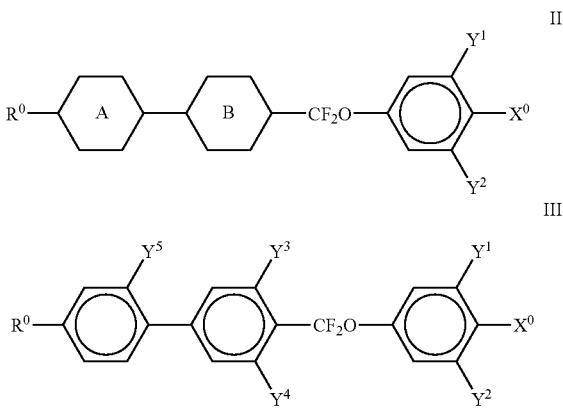

in which
R⁰ denotes a halogenated or unsubstituted alkyl or alkoxy radical having 1 to 15 C atoms, in which one or more CH₂ groups are optionally, independently of one another, replaced by —C≡C—, —CF₂O—, —CH=CH—,

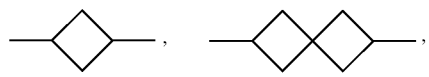

—O—, —CO—O— or —O—CO— in such a way that O atoms are not linked directly to one another,
X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms,
$Y^{1-5}$ each, independently of one another, denote H or F, and

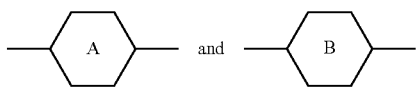

each, independently of one another, denote

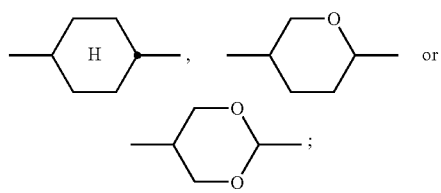

20-70% by weight of a compound of formulae IX, X, XI, XII or XIII,

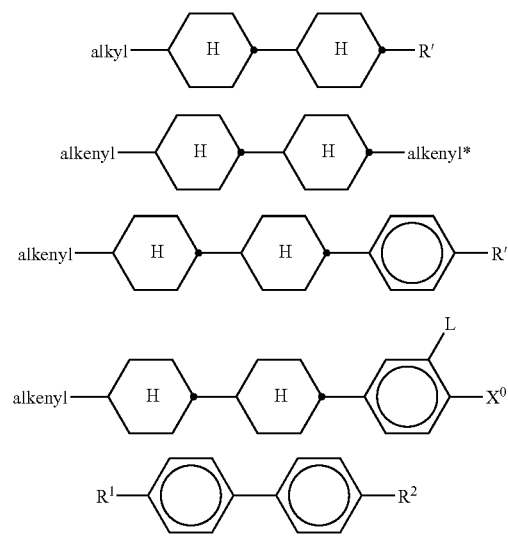

in which
X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms,
L denotes H or F,
"alkyl" denotes $C_{1-7}$-alkyl,
R' denotes $C_{1-7}$-alkyl, $C_{1-6}$-alkoxy or $C_{2-7}$-alkenyl, and
"alkenyl" and "alkenyl*" each, independently of one another, denote $C_{2-7}$-alkenyl,
$R^1$ and $R^2$ each, independently of one another, denote n-alkyl, alkoxy, oxaalkyl, fluoroalkyl or alkenyl, each having up to 9 C atoms, where at least one of the radicals $R^1$ and $R^2$ denotes alkenyl having 2 to 7 C atoms,
and;
4-30% by weight of a compound of formula XVII

XVII

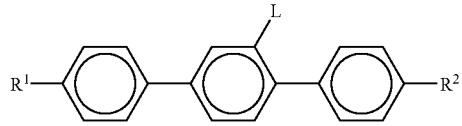

in which
$R^1$ and $R^2$ each, independently of one another, denote n-alkyl, alkoxy, oxaalkyl, fluoroalkyl or alkenyl, each having up to 9 C atoms, and
L denotes H or F.

41. A liquid-crystalline medium according to claim 40, comprising a compound of formula Ia, Ic, Id, or Ie

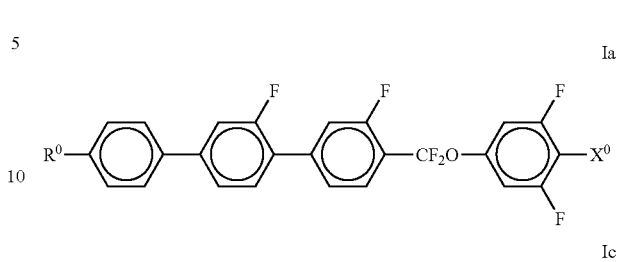

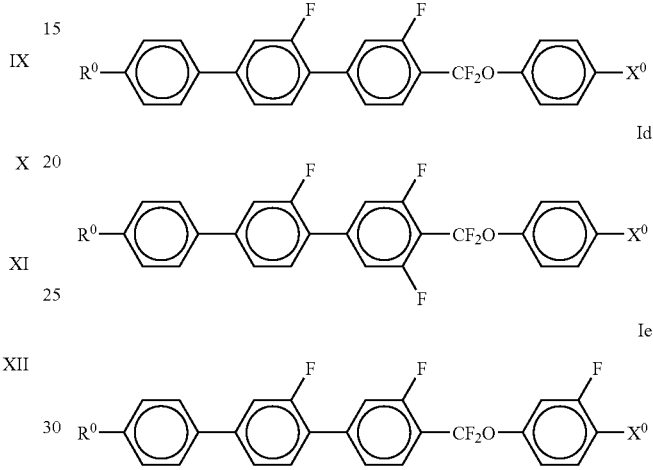

in which R⁰ and X⁰ have the meaning indicated for compounds of formula I.

42. A liquid-crystalline medium according to claim 40, further comprising a compound of formula IV, V, VI, VII or VIII:

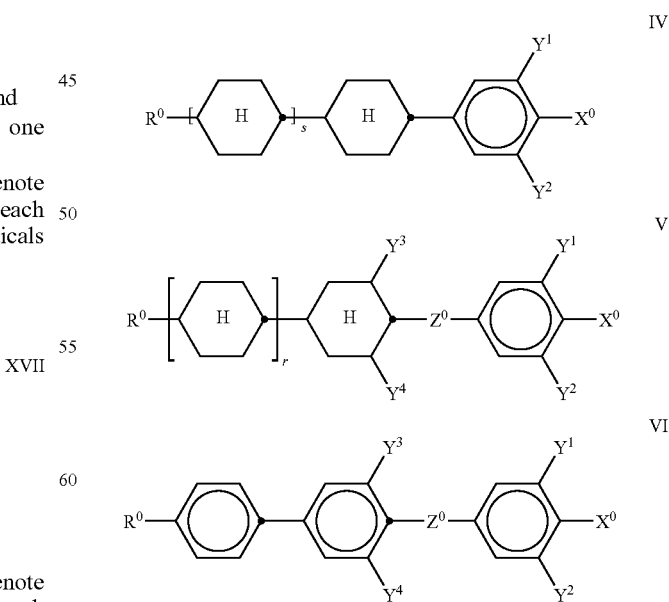

-continued

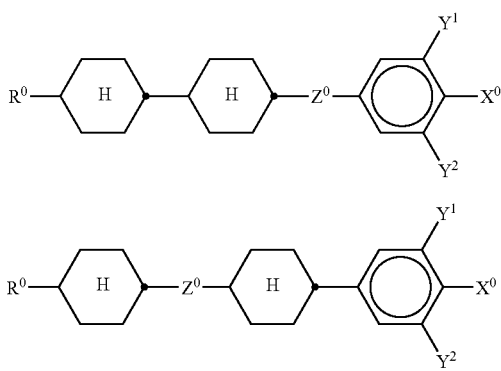

in which
R⁰ denotes a halogenated or unsubstituted alkyl or alkoxy radical having 1 to 15 C atoms, in which one or more CH₂ groups are optionally, independently of one another, replaced by —C≡C—, —CF₂O—, —CH=CH—,

—O—, —CO—O— or —O—CO— in such a way that O atoms are not linked directly to one another,
X₀ denotes F, Cl, CN, SF₅, SCN, NCS, a halogenated alkyl radical, a halogenated alkenyl radical, a halogenated alkoxy radical or a halogenated alkenyloxy radical having up to 6 C atoms,
Y¹⁻⁴ each, independently of one another, denote H or F, Z₀ denotes —C₂H₄—, —(CH₂)₄—, —CH=CH—, —CF=CF—, —C₂F₄—, —CH₂CF₂—, —CF₂CH₂—, —CH₂O—, —OCH₂—, —COO— or —OCF₂—, in formulae V and VI also a single bond, in formulae V and VIII also —CF₂O—,
r denotes 0 or 1, and
s denotes 0 or 1.

43. A process for preparing a liquid-crystalline medium according to claim 40, comprising mixing together a compound of formula I a compound of formula II or III, a compound of formula IX, X, XI, XII, or XIII, and a compound of formula XVII with further liquid-crystalline compounds and/or additives.

44. An electro-optical apparatus, comprising a liquid-crystalline medium according to claim 40.

45. An electro-optical liquid-crystal display containing a liquid-crystalline medium according to claim 40.

46. A liquid-crystalline medium according to claim 40, which has a nematic phase down to −20° C., a clearing point ≧70° C., and a rotational viscosities γ₁ of ≦90 mPa·s.

47. A liquid-crystalline medium according to claim 40, which has a dielectric anisotropy Δε of ≧+3.

48. A liquid-crystalline medium according to claim 40, which has a threshold voltage of ≦2.0 V.

49. A liquid-crystalline medium according to claim 40, which has a birefringence Δn of ≧0.10.

50. A liquid-crystalline medium according to claim 40, which has a nematic phase range of 90°.

51. A liquid-crystalline medium according to claim 40, which has a nematic phase range of −25° to +70° C.

52. A method for increasing the light and/or UV stability of a liquid-crystalline medium comprising adding a compound of formula I, a compound of formula II or III, a compound of formula IX, X, XI, XII or XIII, and a compound of formula XVII to said liquid-crystalline medium to form a liquid-crystalline medium according to claim 40.

* * * * *